(12) United States Patent
Ngo et al.

(10) Patent No.: US 9,049,547 B2
(45) Date of Patent: Jun. 2, 2015

(54) DISPLAYING PLACE-RELATED CONTENT ON A MOBILE DEVICE

(75) Inventors: Ngoc Bich Ngo, Ottawa (CA); Jason Christopher Beckett, Kitchener (CA); Siamak Sartipi, Waterloo (CA)

(73) Assignee: BlackBerry Limited, Waterloo, CA (US)

( * ) Notice: Subject to any disclaimer, the term of this patent is extended or adjusted under 35 U.S.C. 154(b) by 0 days.

(21) Appl. No.: 13/600,864

(22) Filed: Aug. 31, 2012

(65) Prior Publication Data

US 2014/0066106 A1 Mar. 6, 2014

(51) Int. Cl.
*H04W 4/02* (2009.01)
*G06F 3/048* (2013.01)
*H04M 1/725* (2006.01)

(52) U.S. Cl.
CPC .............. *H04W 4/02* (2013.01); *G06F 3/048* (2013.01); *H04M 1/72572* (2013.01); *H04M 2250/22* (2013.01); *H04W 4/021* (2013.01)

(58) Field of Classification Search
USPC .............. 707/802; 454/422.1; 455/422.1, 457
See application file for complete search history.

(56) References Cited

U.S. PATENT DOCUMENTS

| | | | |
|---|---|---|---|
| 7,103,420 B2 | 9/2006 | Brown et al. |
| 7,912,837 B2 | 3/2011 | Buron et al. |
| RE42,285 E | 4/2011 | Anderson et al. |
| 7,925,272 B2 | 4/2011 | Hjelm et al. |
| 8,250,096 B2 | 8/2012 | Su et al. |
| 8,285,716 B1 | 10/2012 | Srinivasaiah |
| 8,321,527 B2 | 11/2012 | Martin et al. |
| 2003/0023726 A1 | 1/2003 | Rice et al. |
| 2005/0108213 A1 | 5/2005 | Riise et al. |
| 2005/0270311 A1 | 12/2005 | Rasmussen et al. |
| 2006/0101005 A1 | 5/2006 | Yang et al. |
| 2006/0141985 A1 | 6/2006 | Patel et al. |
| 2006/0149734 A1 | 7/2006 | Egnor et al. |
| 2006/0149742 A1 | 7/2006 | Egnor |
| 2007/0198495 A1 | 8/2007 | Buron et al. |
| 2008/0270366 A1 | 10/2008 | Frank |
| 2008/0288165 A1 | 11/2008 | Suomela et al. |
| 2009/0171686 A1 | 7/2009 | Eberstadt |
| 2009/0240564 A1 | 9/2009 | Boerries et al. |

(Continued)

FOREIGN PATENT DOCUMENTS

| | | |
|---|---|---|
| DE | 202013000058 U1 | 2/2013 |
| EP | 2348423 A2 | 7/2011 |

(Continued)

OTHER PUBLICATIONS

European Search report from related EP application No. 12179322.8 dated Apr. 5, 2013.

(Continued)

*Primary Examiner* — Myron K Wyche
(74) *Attorney, Agent, or Firm* — Moffat & Co.

(57) ABSTRACT

A computer-implemented method of presenting place-related content on a computing device entails, in response to receiving input identifying a place, obtaining place-related content for the place from a place database that stores place-related data related to each one of a plurality of places and presenting the place-related content from the place database in a consolidated place-specific view. This technology provides a place-centric view that presents a consolidated view of place-related content for a selected place.

18 Claims, 20 Drawing Sheets

(56) References Cited

U.S. PATENT DOCUMENTS

| | | |
|---|---|---|
| 2009/0241040 A1 | 9/2009 | Mattila et al. |
| 2009/0282003 A1 | 11/2009 | Hirata |
| 2010/0076968 A1* | 3/2010 | Boyns et al. ............... 707/732 |
| 2010/0331016 A1 | 12/2010 | Dutton et al. |
| 2011/0035449 A1 | 2/2011 | Amidon et al. |
| 2011/0057790 A1 | 3/2011 | Martin et al. |
| 2011/0060807 A1 | 3/2011 | Martin et al. |
| 2011/0060808 A1 | 3/2011 | Martin et al. |
| 2011/0105143 A1 | 5/2011 | Harple et al. |
| 2011/0181540 A1 | 7/2011 | Nakamura et al. |
| 2011/0201348 A1 | 8/2011 | Murray et al. |
| 2011/0289433 A1 | 11/2011 | Whalin et al. |
| 2012/0011167 A1* | 1/2012 | Schmidt ..................... 707/802 |
| 2012/0042036 A1 | 2/2012 | Lau et al. |
| 2012/0110458 A1 | 5/2012 | Brown et al. |
| 2012/0122481 A1 | 5/2012 | Aceves et al. |
| 2012/0290977 A1 | 11/2012 | Devecka |
| 2012/0290979 A1 | 11/2012 | Devecka |
| 2012/0313780 A1* | 12/2012 | Stout et al. .................. 340/540 |
| 2013/0019185 A1 | 1/2013 | Zhang |
| 2013/0046831 A1 | 2/2013 | Schultz et al. |
| 2013/0058632 A1 | 3/2013 | Jackson |
| 2013/0065613 A1 | 3/2013 | Stopel et al. |
| 2013/0138622 A1 | 5/2013 | Ayers et al. |
| 2014/0068451 A1 | 3/2014 | Ngo et al. |

FOREIGN PATENT DOCUMENTS

| | | |
|---|---|---|
| WO | 2009151928 A2 | 12/2009 |
| WO | 2011053909 A1 | 5/2011 |
| WO | 2013084032 A1 | 6/2013 |

OTHER PUBLICATIONS

European search report from related EP application 12006307.7 dated Dec. 12, 2012.

European search report from related EP application 112179321.0 dated Mar. 15, 2013.

European search report from related EP application 12182694.5 dated Apr. 24, 2013.

International Search Report dated Oct. 15, 2013 from related PCT application No. PCT/CA2013/000668.

Office Action dated Sep. 25, 2014, which issued in corresponding U.S. Appl. No. 13/745,123.

European Office Action dated Oct. 29, 2014 which issued on related EP Application No. 12006307.8.

United States Office Action dated Nov. 20, 2014 which issued on related U.S. Appl. No. 13/744,946.

United States Office Action dated Dec. 4, 2014 which issued on related U.S. Appl. No. 14/044,225.

United States Office Action dated Jan. 8, 2015 which issued on related U.S. Appl. No. 13/745,123.

EP 2706496 (English) which corresponds to cited DE 202013000058.

European Search Report dated Oct. 14, 2014 which issued on related EP Application No. 14183399.6.

\* cited by examiner

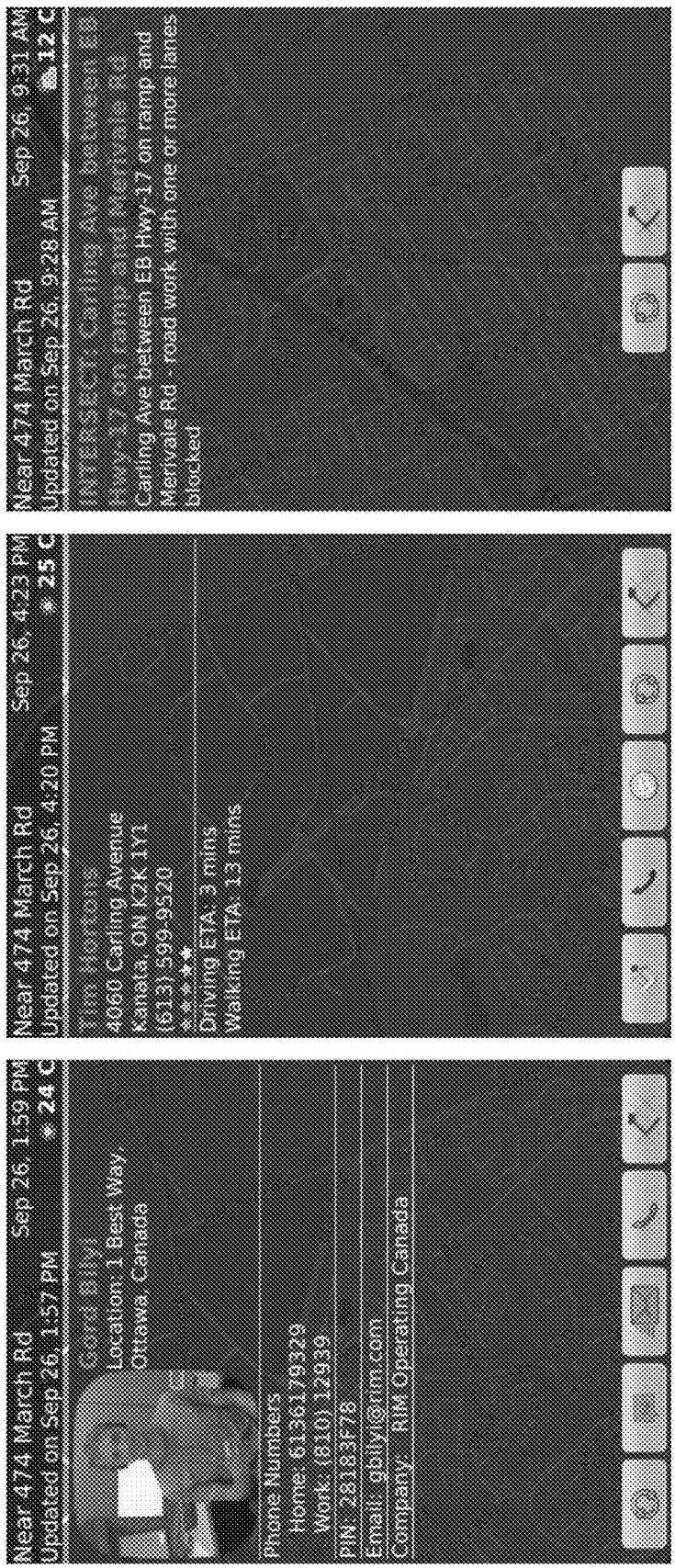

DISPLAYING PLACE-RELATED CONTENT ON A MOBILE DEVICE

CROSS-REFERENCE TO RELATED APPLICATIONS

This is the first application filed for the present technology.

TECHNICAL FIELD

The present technology relates generally to mobile devices and, in particular, to location-based services for mobile devices.

BACKGROUND

Mobile devices or wireless communications device may offer location-based services (LBS). In a traditional paradigm, each application on the device that utilizes location data (e.g. maps, calendar, address book, instant messaging, etc.) stores its own location data. This redundant data is not only duplicated on the device but techniques for sharing of this data across applications are presently quite limited. Furthermore, although these devices provide for contact-centric and event-centric views (via address book and calendar applications, respectively), there has thus far been no place-centric view that presents all place-related content for a selected place in a consolidated view.

BRIEF DESCRIPTION OF THE DRAWINGS

Further features and advantages of the present technology will become apparent from the following detailed description, taken in combination with the appended drawings, in which:

FIG. 17*a* depicts a place view for a contact;

FIG. 17*b* depicts a place view for a coffee shop;

FIG. 17*c* depicts a place view for an intersection, showing a traffic update;

It will be noted that throughout the appended drawings, like features are identified by like reference numerals.

DETAILED DESCRIPTION

Figure 1:
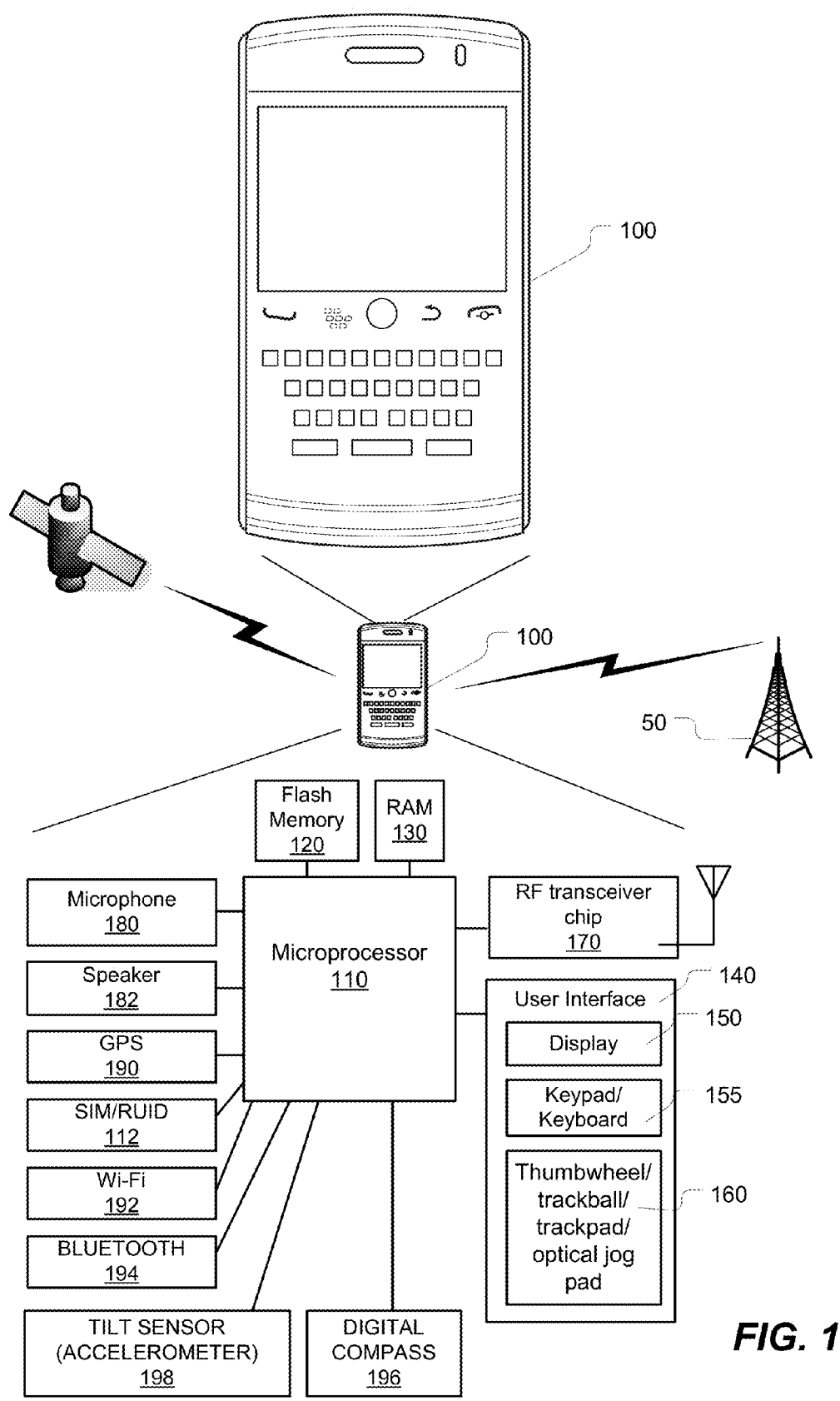
FIG. 1 is a depiction of a mobile device on which the present technology may be implemented, the depiction including a schematic depiction of some components of the mobile device.

A place view displays on a user interface (UI) of a computing device, such as a mobile device, various place-related content for a place. The place view is thus a consolidation, ensemble or collection, presented in one single consolidated view, of place-related content that would otherwise be viewable only through separate and discrete applications: photos, videos, blogs, contacts, meetings, events, appointments, tasks, news, weather, social media feeds, location-based services, location-based advertising, promotions, e-coupons, etc. that occur at or near the place, or which have some relevancy or connection to the place. The place view displays place-related information and content for a selected place and time that informs the user of who is nearby, what he should do, what is going on, what opportunities or deals can be had, etc. The place view thus constitutes a place-centric or place-specific view of all or a subset of all available place-related content for a selected place and its immediate vicinity or environs.

In some implementations, the place data for the place-related content is obtained from a centralized place database that is stored locally on the user's computing device or, alternatively, is remotely accessible by the computing device. In these implementations, the place database may be a single consolidated repository of all place-related data relating to each one of a plurality of places. In other implementations, the place data may be obtained from a plurality of sources, which may be stored on the device and/or off the device. In these other implementations, the device may include a place data management service (Places Service) that handles all place data requests and obtains the place data from the various sources.

By implementing this place-centric paradigm, the computing device may present to the user relevant place-related content for a specific place selected by the user or determined automatically by the device. Although devices have conventionally provided contact-centric and event-centric views (via address book and calendar applications, respectively), there has until now been no place-centric view that enables a user to view all place-related content for a selected place. The present technology satisfies this need by providing a place-centric or place-specific view (hereinafter a "place view") that consolidates and presents all or a subset of all available place-related content for a place. The place view presents context-sensitive, predictive, discoverable and recommended content at and/or near the user's selected place. For example, predictive content may be based on a calendar, e.g. what events or appointments are coming up. Recommended content may be based on user profile and preference and/or based on current context (location, time, etc.) that enables the device to suggest places, e.g. restaurants, hotels, etc. that may be of interest to the user. Discoverable content is based on a user's social graph and may include such content as, for example, friends' blogs or recommendations for places. People, events and places are interrelated. The place view completes that circle, enabling the user to switch seamlessly to people view (contacts) and events view (calendar). The place view thus serves as a pivot point to the people view (contacts or address book) and events view (calendar, datebook, agenda or diary). For example, when a place is viewed in the place view, a contact or event that is presented in relation to the place in the place view may be selected by the user, e.g. touching or selecting a hyperlink. The contact may then be viewed in the contact view (e.g. address book) by selecting the contact in the place view, i.e. the place view is replaced by the people view. Similarly, the event may be viewed in the event view (calendar) by selecting the event in the place view, i.e. the event view replaces the place view. The user may navigate amongst the place view, people view and event view to view content from these different perspectives.

Accordingly, one aspect of the present technology is a computer-implemented method of presenting place-related content on a computing device. The method entails, in response to receiving input identifying a place, obtaining place-related content for the place, e.g. from a place database that stores place-related data related to each one of a plurality of places or from multiple data sources stored locally on the device and/or remotely accessible by the device. The method further entails presenting all or a subset of the place-related content in a consolidated place-specific view.

Another aspect of the present technology is a computer-readable medium comprising instructions in code which when loaded into a memory and executed by a processor of a computing device cause the computing device to, in response to receiving input identifying a place, obtain place-related content for the place, e.g. from a place database that stores place-related data related to each one of a plurality of places or from multiple data sources stored locally on the device and/or remotely accessible by the device, and present all or a subset of the place-related content in a consolidated place-specific view.

Another aspect of the present technology is a computing device comprising a memory operatively coupled to a processor for processing input identifying a place and, in response to receiving the input, for requesting place-related data for the place by communicating the request to a place data management service for obtaining the place data from a place database or from one or more data sources locally stored in the memory of the device and/or remotely accessible by the device. The processor, in response to receiving the place-related content for the place from the place data management service, causes a display to present all or a subset of the place-related content in a consolidated place-specific view.

The details and particulars of these aspects of the technology will now be described below, by way of example, with reference to the drawings.

FIG. 1 is a depiction of a wireless communications device or mobile device as one example of a computing device that may be used to implement this novel technology. Examples of a mobile device or wireless communications device include cell phones, smart phones, mobile phones, portable digital assistants, or any other such portable or handheld electronic communications devices such as laptops, tablets, pads, notebooks, palmtops, or like devices that have a processor, memory and display. This novel place view technology is particularly useful for mobile devices but it can also be used on desktop computers, workstations, terminals or any other fixed or static computing device.

As shown by way of example in FIG. 1, the mobile device, which is generally designated by reference numeral 100, and which represents one example of a computing device, includes a processor 110 and memory 120, 130 for executing one or more applications. The memory may include flash memory 120 and/or random access memory (RAM) 130. Other types or forms of memory may be used.

As depicted by way of example in FIG. 1, the mobile device 100 includes a user interface 140 for interacting with the mobile device and its applications and, in this instance, for receiving user input to set up a call to another device. The user interface 140 may include one or more input/output devices, such as a display screen 150 (e.g. an LCD or LED screen or touch-sensitive display screen), and a keyboard or keypad 155. The user interface may also include an optical jog pad 160 and/or a thumbwheel, trackball, track pad or equivalent.

As depicted by way of example in FIG. 1, the mobile device 100 may include a wireless transceiver 170 for communicating with other devices. The transceiver 170 may be a radiofrequency (RF) transceiver for wirelessly communicating with one or more base stations 50 over a cellular wireless network using cellular communication protocols and standards for both voice calls and packet data transfer such as GSM, CDMA, GPRS, EDGE, UMTS, LTE, etc. Where the computing device 100 is a wireless communications device, the device may include a Subscriber Identity Module (SIM) card 112 for GSM-type devices or a Re-Usable Identification Module (RUIM) card for CDMA-type devices. The RF transceiver 170 may include separate voice and data channels.

The mobile device 100 may optionally include one or more ports or sockets for wired connections, e.g. USB, HDMI, FireWire (IEEE 1394), etc. or for receiving non-volatile memory cards, e.g. SD (Secure Digital) card, miniSD card or microSD card.

For voice calls, the mobile device 100 includes a microphone 180, a speaker 182 and/or an earphone jack. Optionally, the device may include a speech-recognition subsystem for transforming voice input in the form of sound waves into an electrical signal. The electrical signal is then processed by a speech-recognition module (digital signal processor) to determine voice commands from the voice input. Voice commands may be used to initiate a call and to select the call recipient from an address book.

Optionally, the mobile device 100 includes a positioning subsystem such as a Global Positioning System (GPS) receiver 190 (e.g. in the form of a chip or chipset) for receiving GPS radio signals transmitted from one or more orbiting GPS satellites. References herein to "GPS" are meant to include Assisted GPS and Aided GPS. Although the present disclosure refers expressly to the "Global Positioning System", it should be understood that this term and its abbreviation "GPS" are being used expansively to include any satellite-based navigation-signal broadcast system, and would therefore include other systems used around the world including the Beidou (COMPASS) system being developed by China, the multi-national Galileo system being developed by the European Union, in collaboration with China, Israel, India, Morocco, Saudi Arabia and South Korea, Russia's GLONASS system, India's proposed Regional Navigational Satellite System (IRNSS), and Japan's proposed QZSS regional system.

Another sort of positioning subsystem may be used as well, e.g. a radiolocation subsystem that determines its current location using radiolocation techniques, as will be elaborated below. In other words, the location of the device can be determined using triangulation of signals from in-range base towers, such as used for Wireless E911. Wireless Enhanced 911 services enable a cell phone or other wireless device to be located geographically using radiolocation techniques such as (i) angle of arrival (AOA) which entails locating the caller at the point where signals from two towers intersect; (ii) time difference of arrival (TDOA), which uses multilateration like GPS, except that the networks determine the time difference and therefore the distance from each tower; and (iii) location signature, which uses "fingerprinting" to store and recall patterns (such as multipath) which mobile phone signals exhibit at different locations in each cell. A Wi-Fi™ Positioning System (WPS) may also be used as a positioning subsystem. Radiolocation techniques and/or WPS may also be used in conjunction with GPS in a hybrid positioning system.

Optionally, the mobile device 100 may include a Wi-Fi™ transceiver 192, a Bluetooth® transceiver 194, and/or a near-field communications (NFC) chip. The mobile device 100 may also optionally include a transceiver for WiMax™ (IEEE 802.16), a transceiver for ZigBee® (IEEE 802.15.4-2003 or other wireless personal area networks), an infrared transceiver or an ultra-wideband transceiver.

Optionally, the mobile device may include other sensors like a digital compass 196 and/or a tilt sensor or accelerometer 198.

The mobile device 100, which is one example of a computing device, thus uses its memory 120, 130 (in one implementation) to store all place data for the mobile device in a centralized place data store for each of a plurality of places. The centralized place data store may be a single data store or may be a group of co-operative data stores, or any suitable arrangement of data stores. The centralized database or data store may be a unified, common, or shared database or data store. The processor 110 is operatively coupled to the memory 120, 130 to execute a plurality of applications. These applications may require positioning data, e.g. GPS coordinates. The processor determines when location data or more broadly place-related data is required for the applications and obtain all of the location data and/or place-related data required for all applications on the mobile device from the centralized place data store (or database) 200. In another implementation, the centralized data store (or database) may be situated at a server or server cluster accessible by the mobile device. In yet other implementations, the place data may be stored in various storage media on or off the device. In other words, the place data may be obtained from sources local to the device or remotely accessible by the device. A place data management service on the device may receive and handle place data requests. This service obtains the requested place data from the various sources.

For the purposes of this specification, place data (or place-related data) is data, e.g. computer-readable code, that represents place-related information or place-related content that describes a place. The place-related content and information may be text, maps, photos, video, audio files, or other data. The place-related information and content is thus a multi-faceted description of the place. One element of this description is the location of the place, which may be characterized by location data, such as for example location coordinates, a street address, etc. Thus, the place data encompasses the location data. For the purposes of this specification, place data is meant to encompass not only the data itself but also any references or links to place data stored externally to the centralized place data store. In some embodiments, there may be restrictions inhibiting the physical storage of all place data in the centralized place data store with the rest of the place data. Examples of externally stored data may be any restricted, confidential, or proprietary data that may not be copied to the centralized data store. In these embodiments, only the references or links to the externally stored data are actually stored in the centralized place data store, not the data itself. Nonetheless, the centralized place data management service remains the sole recipient of all place data requests from applications. In other words, all applications on the mobile device access only the place data management service for all required place data.

In one embodiment, the centralized place data store 200 comprises, for each place, a place tag identifying the place. The place is either a physical location or, in some embodiments, a virtual location. A physical location means a geographical location somewhere on earth. A virtual location may be a virtual location or an event that is a proxy for a location such as a meeting (Web conference), conference call, or some other proxy for location that has a location-implicit meaning to the user. In other words, although a virtual meeting may be physically performed at any computer, to the user this virtual meeting implies a place (e.g. his home computer or alternatively his work computer, depending on his own personal context). The physical location is defined by location coordinates, e.g. latitude and longitude coordinates which may be GPS-derived. A user-specified virtual location descriptor identifies the virtual location to the user and this virtual location does not have any physical coordinates associated with it.

Figure 2:
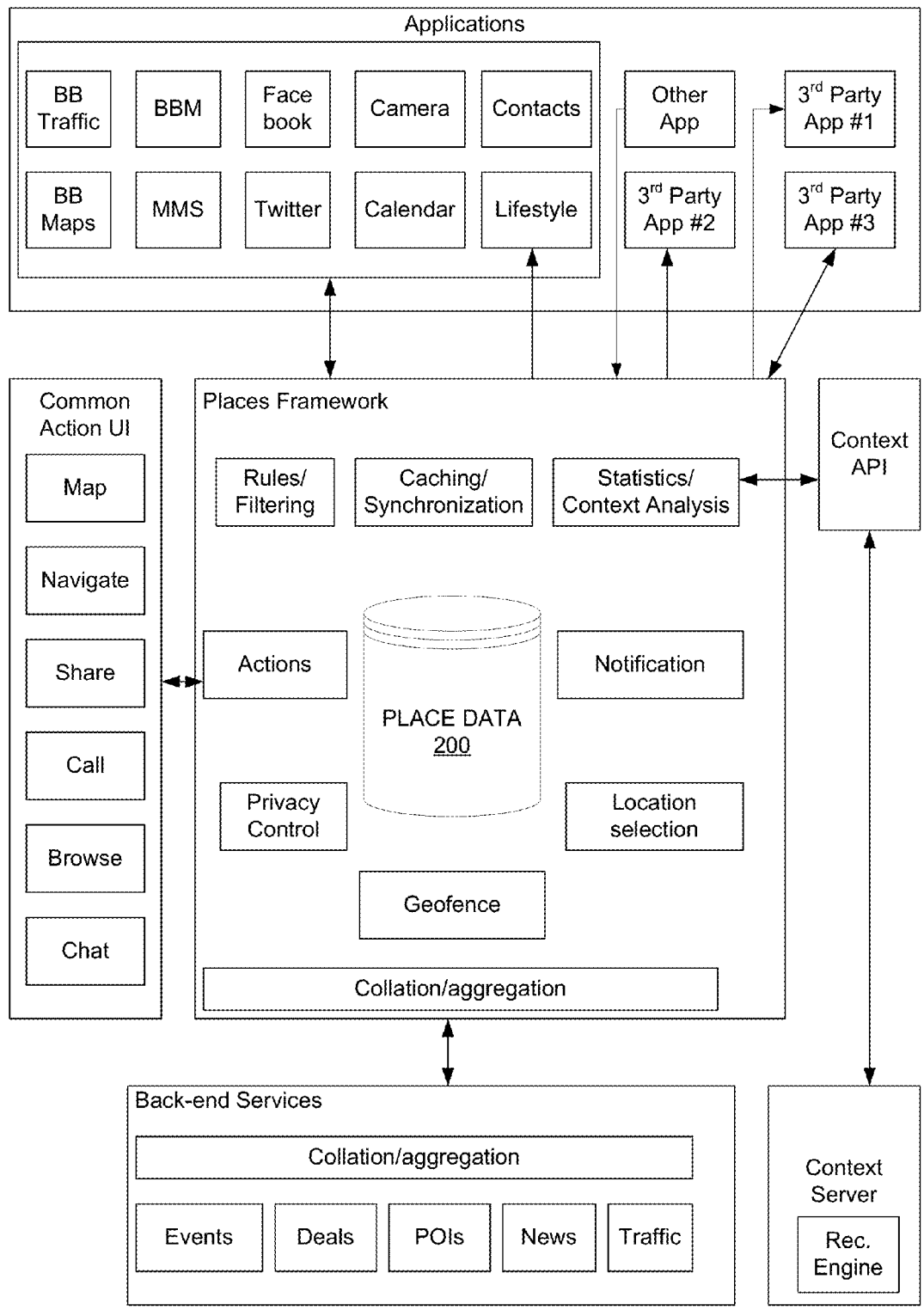
FIG. 2 is a functional block diagram of a place-data management system in accordance with one implementation of the present technology.

Conceptually, the centralized place data store 200 may be understood as being the core of a places framework such as the one depicted schematically in FIG. 2. The place-related data is not only centralized but this data includes semantic place data that provides a much richer level of place-related content that is conventionally provided. As shown by way of example in FIG. 2, a plurality of device applications (be it applications that are native to the device or third-party applications) interact with the place framework. Some apps may be place data contributors, some may be place data consumers, and some may be both consumers and contributors. This framework includes various modules, as shown, for rules/filtering, caching/syncing, statistics/context analysis, actions, privacy control, notification, location selection, geofencing, collation/aggregation. The actions module interacts with a common action UI that provides functionalities such as mapping, navigation, sharing, calling, browsing, chatting, etc. Therefore, for any location, any of these functions can be performed. In one embodiment, depending on the types of place content available for the place, the relevant actions will be associated with the data and thus can be visually presented to the user and acted upon. The place content type may thus limit the available functionalities/actions for a given place.

For example, a share action may be possible for a virtual place whereas a map/navigate action would only be applicable to a physical place (i.e. a real-world location). Backend services, as shown in FIG. 2, may provide collation/aggregation of various content types such as events, deals, POIs, news, traffic incidents, etc. As further depicted by way of example in FIG. 2, the system may include a context API that interacts with a context server having a recommendation engine. This context server may be used to monitor usage patterns (user behaviour) at a given place to see what the user does at that place. Based on the activities and the data requests of the user at that place, the system can intelligently learn the user's personal preferences as they relate to that specific place. This contextual information may be used to supplement the place data in the centralized place data store 200.

Figure 3:
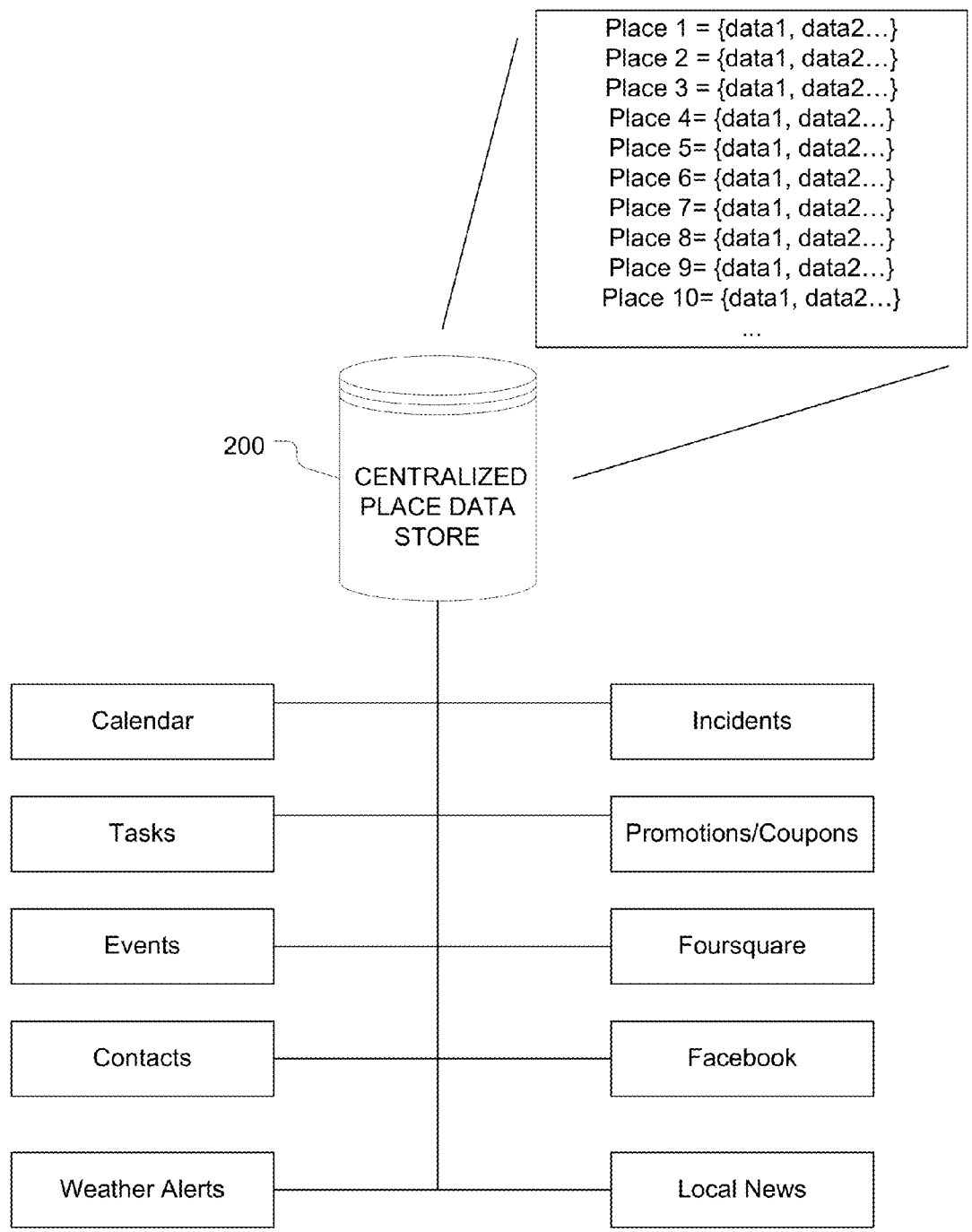
FIG. 3 is a schematic depiction of the centralized place data store for providing all place data to all applications executed by the mobile device.

As further illustrated by way of example in FIG. 3, the centralized place data store 200 stores all of the place-related data for a plurality of places. The places may be user-defined or externally defined places. As shown in FIG. 3, the store 200 stores a collection or list of places. Associated with each place is a set of place-related auxiliary data (or synonymously "place data" or "place-related data"). Place auxiliary data is either application-specific data or non-application specific data that describes the place. An example of application-specific auxiliary data are meeting attendees (calendar app) associated at this given place. An example of non-application specific auxiliary data are video, documentary/blogs, statistical data, etc. associated with the place. The place-related auxiliary data can be physically stored in the central Places database or referenced in the Places database to their respective sources. Each application (calendar, tasks, events, contacts, weather alerts, incidents, promotions, Foursquare, Facebook, local news, etc.) obtains all of its place-related data from the centralized place data store 200. This consolidated data store simplifies data updates, ensure consistency of data, and minimizes memory usage.

Figure 4:
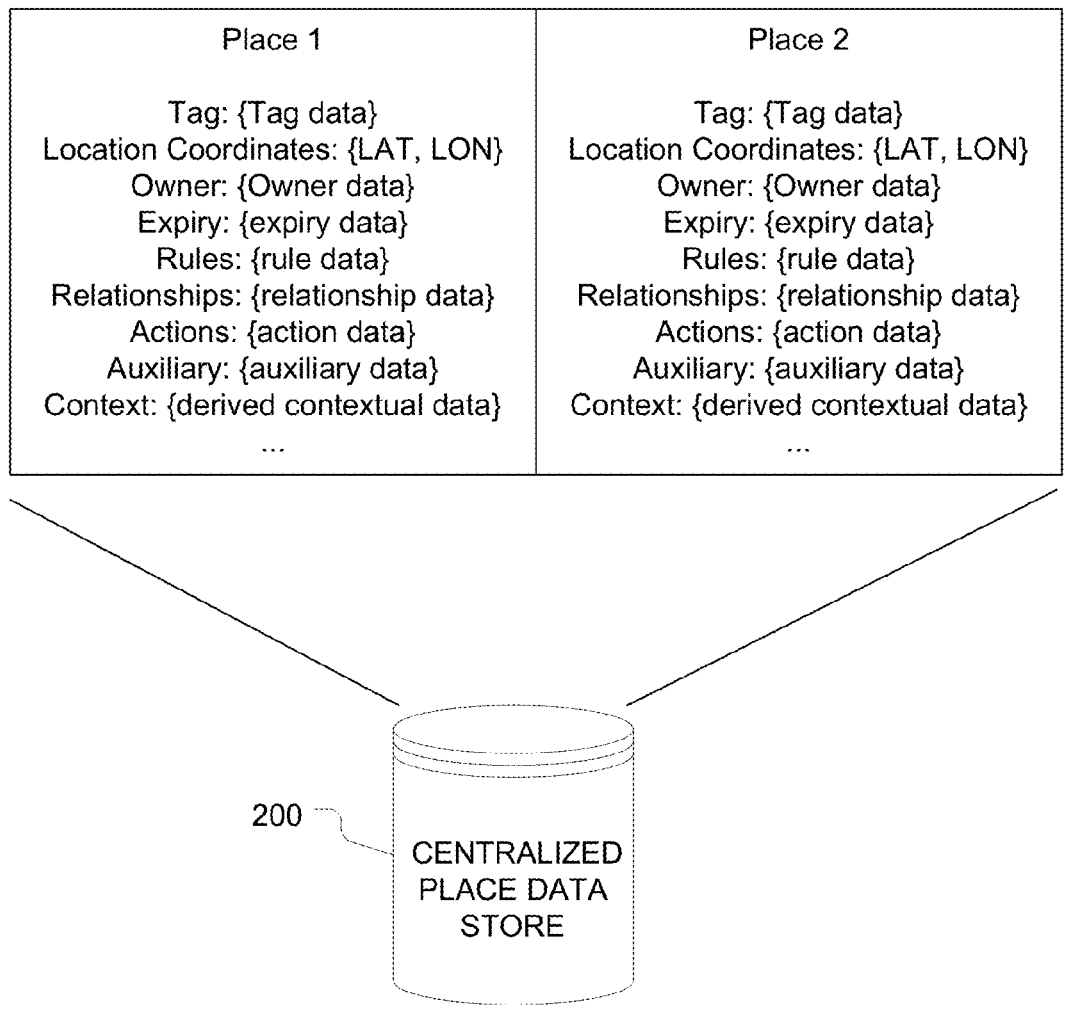
FIG. 4 is a schematic depiction of the various categories or types of place data that the place data store maintains for each place.

FIG. 4 depicts schematically the various types or categories of place data that may be stored in the centralized place data store 200. For example, each place may be characterized by a tag (name) describing the place, location coordinates (latitude and longitude), its category, a description of the place, keywords related to the place, a start/end time (or an expiry time for the data), auxiliary data such as contacts related to the place, images or photos of the place, videos of the place, URLs to websites related to the place. In addition, as shown in FIG. 4, there may be categories such as available actions, rules governing how the place data is to be shared or not amongst the applications running on the device or how this data is accessed, persisted or visually presented, relationships to contacts or other persons, events, or other places that are in some way related to the place, etc. Relationships may also include relationships between the place and another place or between the place and a plurality of other places. Relationships may also encompass relationships between a place and an event. The relationship between a place and people or events is described in the auxiliary data. As will be appreciated, the categories or types of data may vary. Not all of the types or categories of data for a given place will be specified. In some embodiments, only a subset of these categories are utilized.

For example, in one embodiment, the centralized place data store comprises, for each place, a data owner identifier that identifies an application that owns the data. In one embodiment, the centralized place data store comprises, for each place, a set of rules specifying how the data is to be shared, accessed, persisted or visually presented. In one embodiment, the centralized place data store comprises, for each place, a set of relationships identifying contacts related to the place. In one embodiment, the centralized place data store comprises, for each place, an expiry date specifying when the data will expire or need to be refreshed. In one embodiment, the centralized place data store comprises a set of actions to be performed which are relevant or applicable to the place. Any combination of these data characteristics or attributes may be utilized to characterize a place, i.e. to give the place its semantics.

As mentioned above, place data may also be inferred or learned by the mobile device in response to user behaviour or activities performed by the user using the mobile device when situated at a place or when requesting data about a place. Therefore, in one embodiment, the processor and memory cooperate to monitor usage of location and/or place data by a user of a mobile device when located at a place, derive contextual information about the place and the personal preferences of the user with respect to the place, and integrate the contextual information as additional place-related data.

In another aspect of the technology, the mobile device may regulate how place data is delivered to the various applications on the mobile device. Therefore, in one embodiment, the processor and memory cooperate to register an application for proximity notification. The processor then determines if the mobile device is within a predetermined proximity of a place. In response to determining that the mobile device is within the predetermined proximity of the place, the processor provides a proximity notification to the application.

Figure 5:
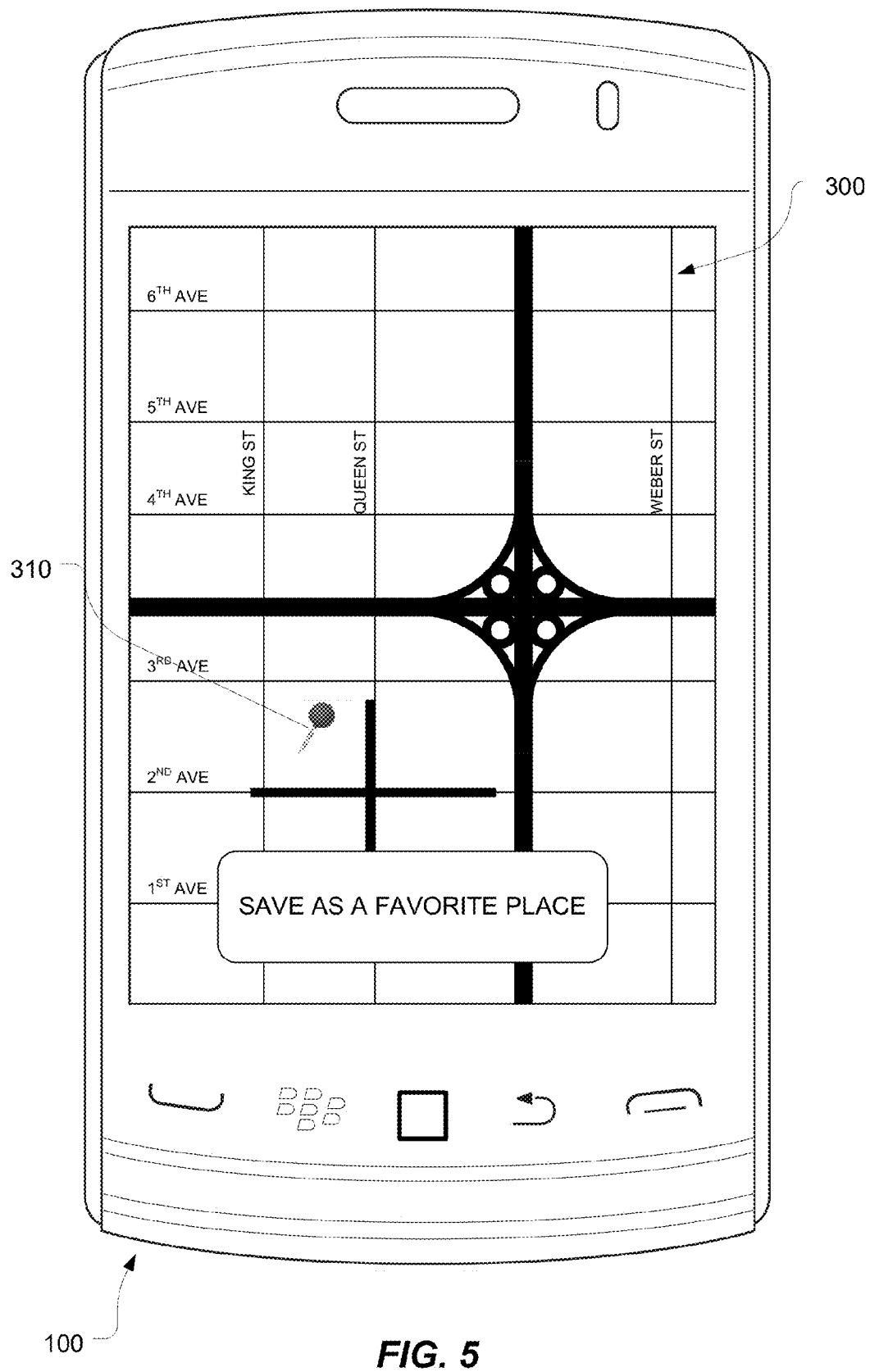
FIG. 5 is an example of a map displayed by a mapping application on a mobile device, showing a user interface element for setting a POI as a favourite place.

FIG. 5 is an example of a map displayed by a mapping application 300 on a mobile device, showing a user interface element for setting a POI 310 as a favourite place.

Figure 6:
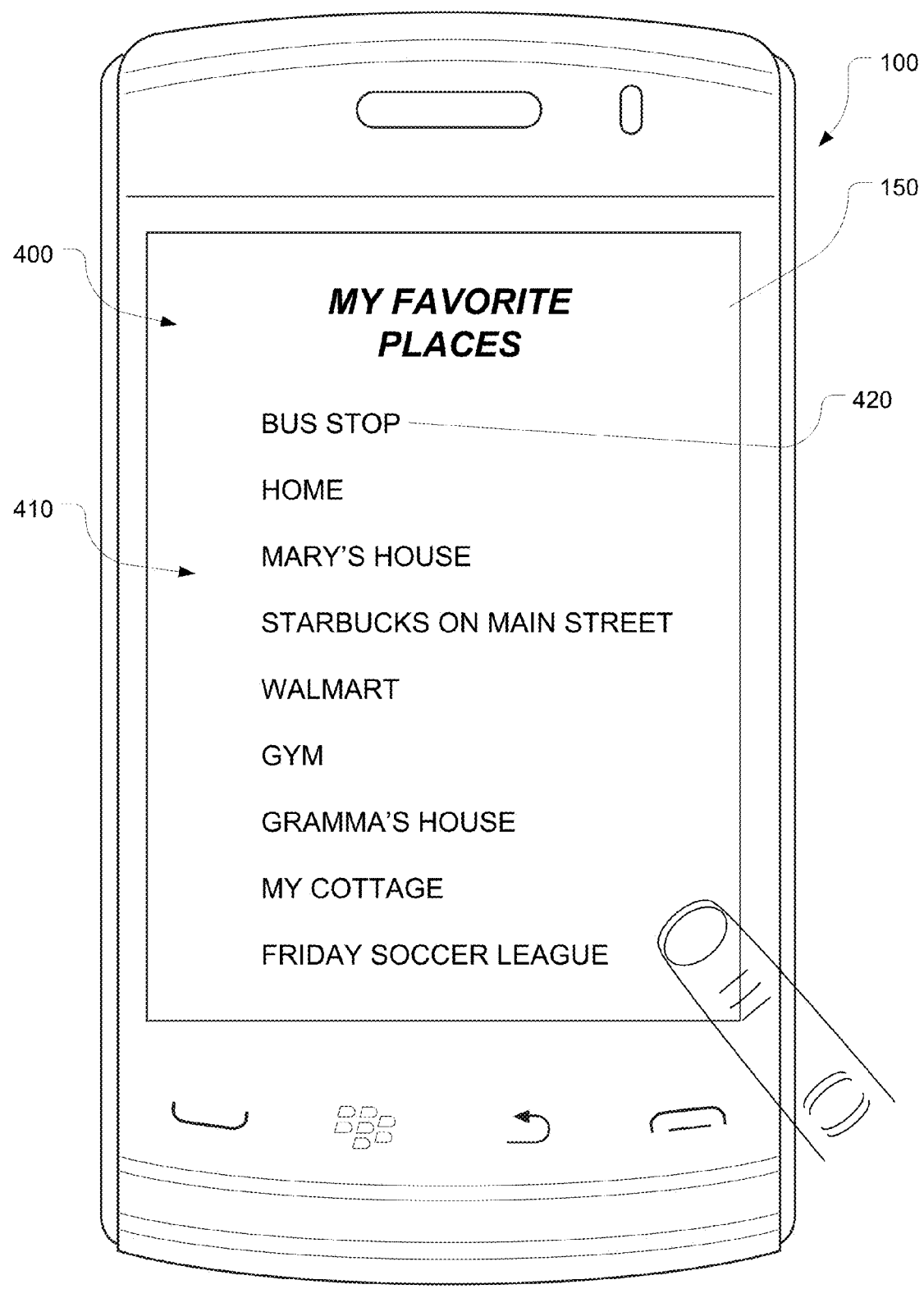
FIG. 6 is an example of a UI that presents favourite places.
Figure 7:
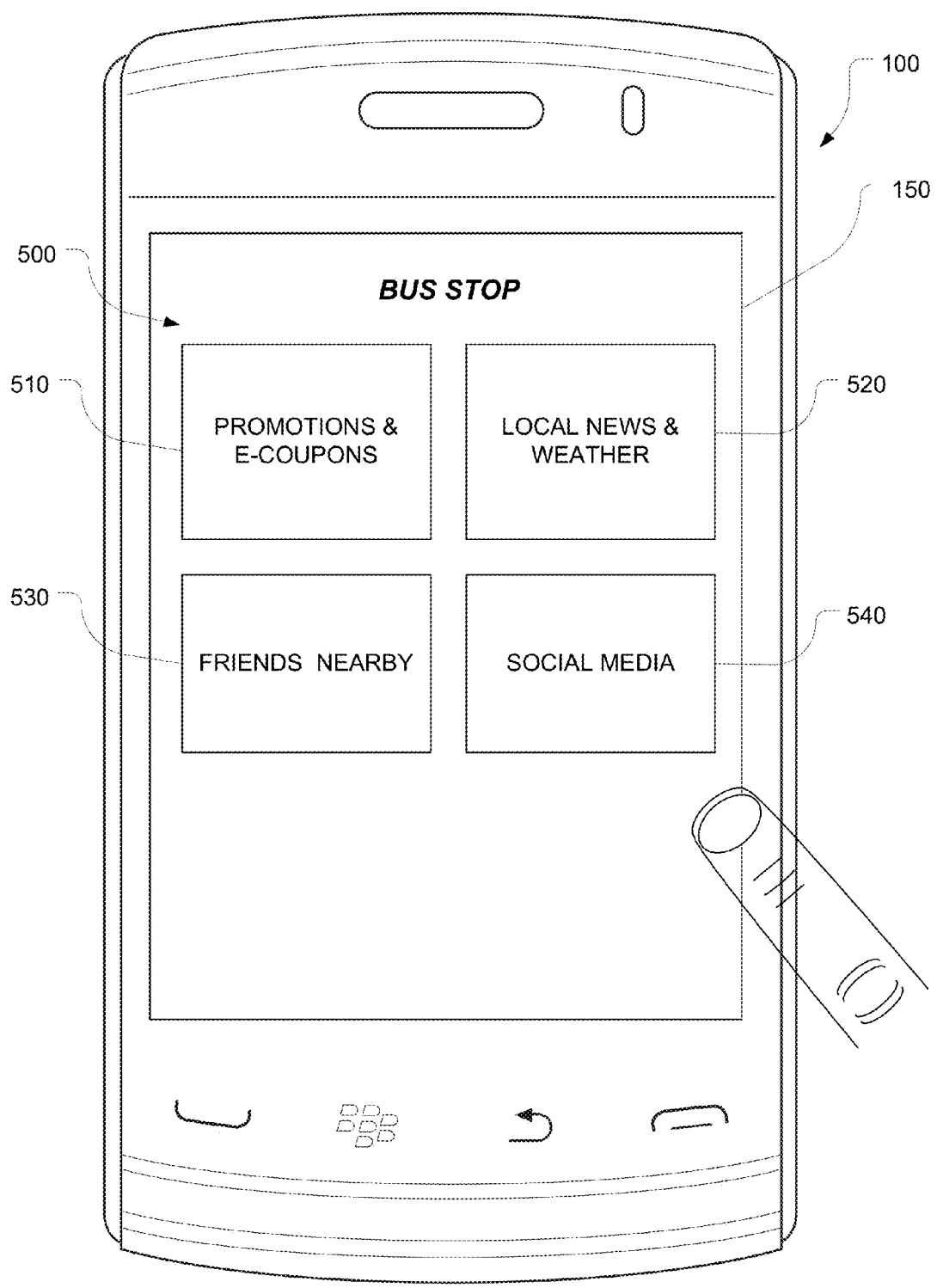
FIG. 7 is an example of a UI that presents place data for one selected place.
Figure 8:
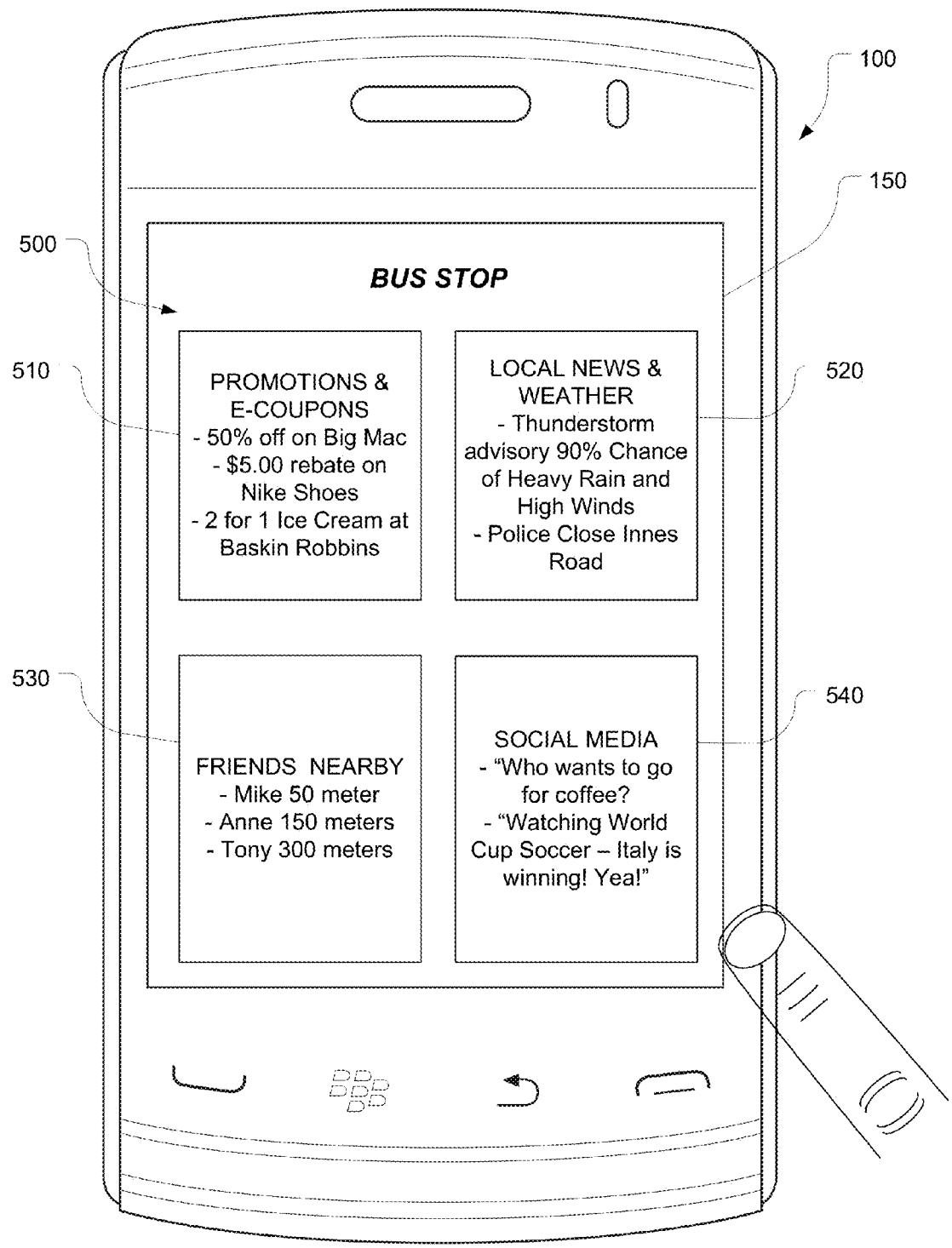
FIG. 8 is another example of a UI that presents place data for one selected place.

FIG. 6 is an example of a UI that displays favourite places ("My Favourite Places") on a display screen 150 of a mobile device 100. The favourite places UI 400 presents the favourite places as a favourite places list 410, although the favourite places may be displayed in any suitable format. In one embodiment, each listed place 420 is user-selectable (by touching or any other appropriate form of user input) to obtain more information about the listed place. For example, touching or selecting bus stop will cause the device 100 to display a place view for the bus stop. The place view may present place-related information (i.e. auxiliary data related to the place) as shown in FIG. 7 or, alternatively, FIG. 8. In the example of FIG. 7, the place view 500 displayed on the display 150 of the mobile device 100 comprises a plurality of user-selectable categories of place-related data, e.g. promotions & e-coupons 510, local news & weather 520, nearby friends 530 and social media 540. These are solely by way of example, and other categories, layouts or labels may be used. The user may select any one of the categories 510-540 by touching the user interface elements. Alternatively, as shown in FIG. 8, the UI may display all or a subset of the available and most recent place data based on time received, relevancy, or any other prioritization scheme. The UI in FIG. 8 shows the promotions and e-coupons that are relevant for the place (i.e. for the Bus Stop), the local news and weather for the bus stop, which friends are near the bus stop, and any social media feeds that may have some relevancy to the area surrounding the bus stop. The place view thus consolidates and presents all place-related content to the user when the user selects the place. Note that selecting a place may be done without the user physically traveling to the place although in one embodiment the place may be set to correspond to the current location of the mobile device. For each UI shown in FIGS. 6-8, there may be applicable actions displayed as will be illustrated, for example, in FIG. 11c). The actions may include, for example, map, go, browse, and call, etc. for the selected place.

Figure 9:
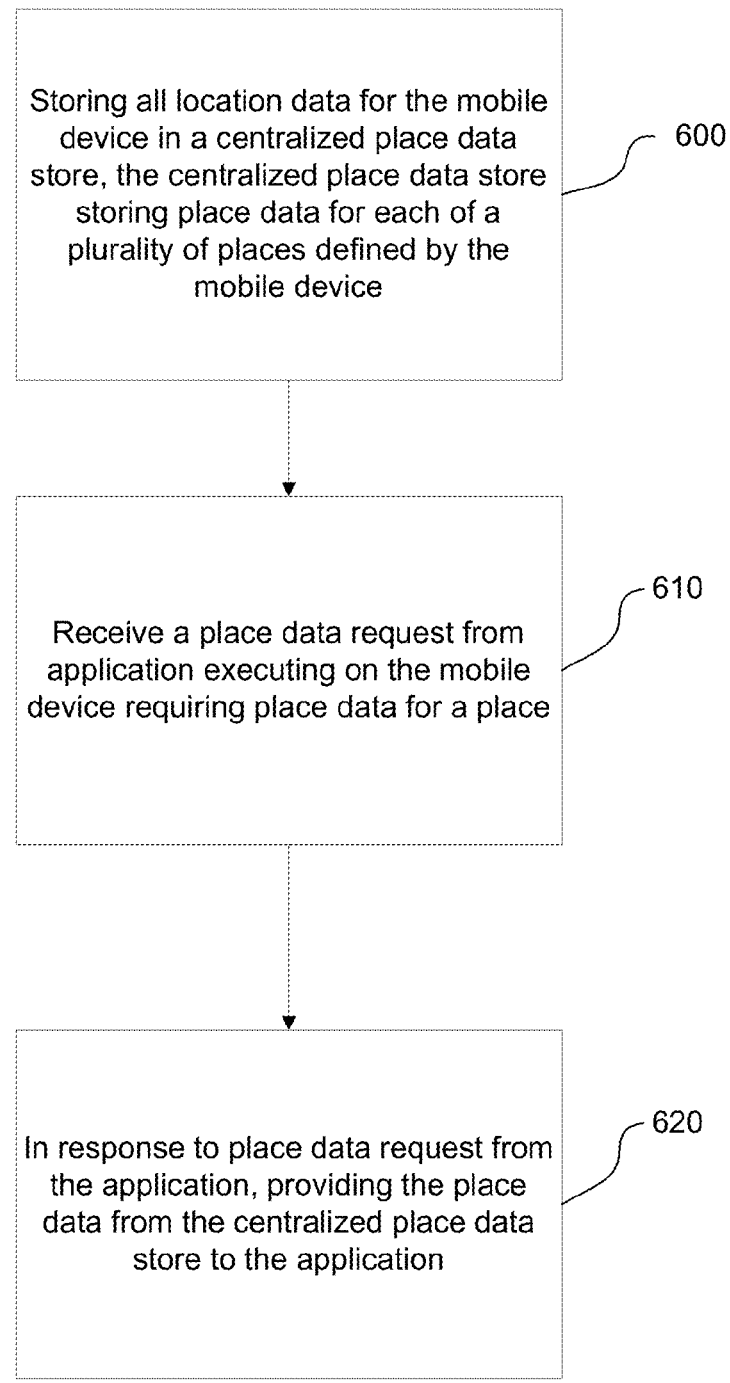
FIG. 9 is a flowchart depicting steps of a method in accordance with one implementation of the present technology.

The foregoing technology also provides a novel method of managing place data for a mobile device. As outlined by the flowchart depicted in FIG. 9, the method comprises a step 600 of storing all place data for the mobile device in a centralized place data store. The centralized place data store stores place data for each of a plurality of places. At step 610, a place data request is received from an application executing on the mobile device. The application requires place data for a place. At step 620, in response to the place data request from the application executing on the mobile device, the device provides the place data from the centralized place data store to the requesting application. Centralizing all place data in a central place repository enables place data to be viewed, updated or added by one application to be accessible to all other applications that have the permission to view that place data. The centralized database makes data sharable among apps on the device, improves security/privacy by implementing configurable data-sharing rules, ensures consistency in how data is presented and used, optimizes memory usage as data is no longer duplicated for each app, and it extensible as new place content sources can be plugged in remotely or onboard. In some embodiments, the place data requests do not need to be received concurrently or simultaneously, and furthermore the applications executing on the device also do not need to be executing concurrently or simultaneously. In some embodiments, all available place data is stored in the data store whereas in other embodiments, only a subset of all available place data is stored in the data store.

FIGS. 10a-17c present various user interfaces that may be used on a mobile device (or other computing device) in relation to the foregoing technology. These are presented solely to further illustrate the inventive concepts and should not be interpreted as limiting the invention or as representing the only UIs that may implement this novel place-data-centric paradigm. Other UIs with other layouts, configurations, and labels may be employed to implement this novel technology.

Figure 10D:
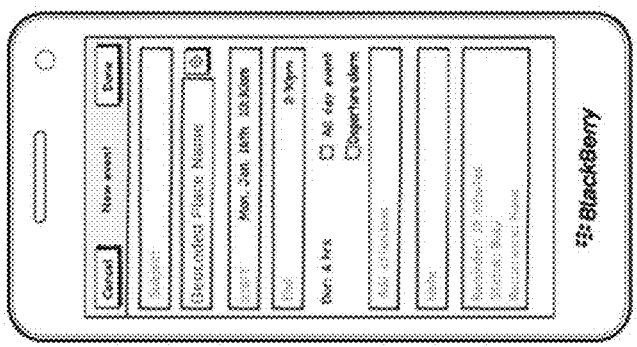
FIGS. 10*a*-10*d* depict mobile device user interfaces for creating new data for a place.
Figure 10C:
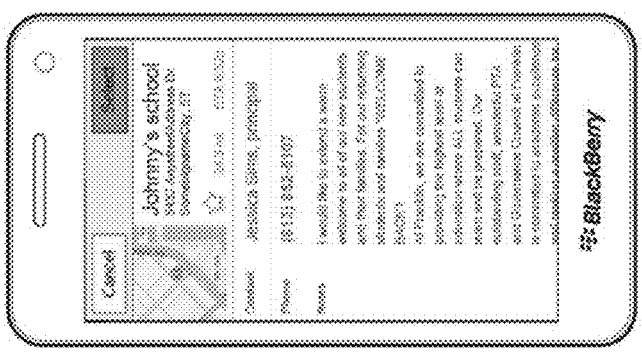
Figure 10B:
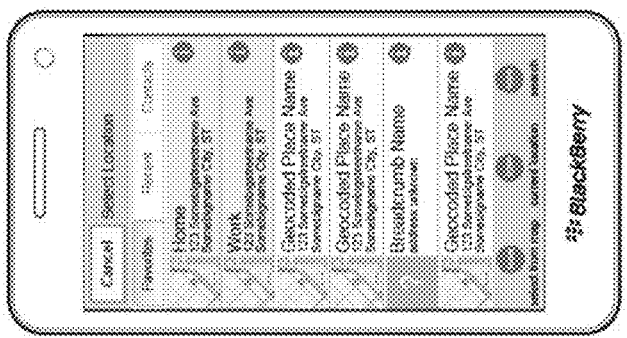
Figure 10A:
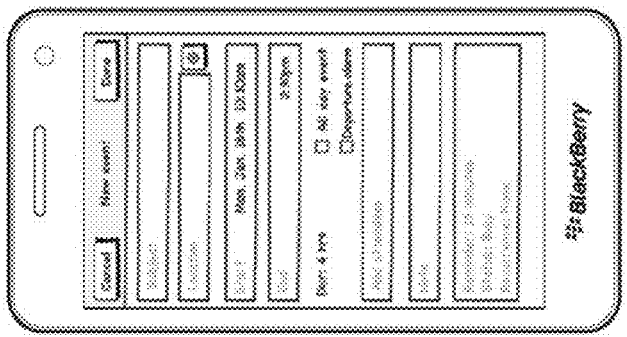

FIGS. 10a-10d depict mobile device user interfaces for creating new data for a place. FIG. 10a shows a UI for creating a new event. Exemplary fields include subject, location, start time, end time, attendees, notes, reminder, status, recurrence, etc. Similarly, FIG. 10d shows the UI in which the location field of the meeting event is now populated with the place selected by the user via the UIs depicted in FIGS. 10b and 10c. FIG. 10b shows a UI that displays a list of places or locations. The device may provide a favourites list, a recent list, and a contacts list, as shown. User interface elements may be provided to select a location from a map, to use the current location of the device or to search. FIG. 10c depicts a UI that displays a place ("Johnny's school"), its address, distance, driving time (ETA), contact information (the principal's name), phone number, and notes relating to the place (i.e. relating to the school).

Figure 11C:
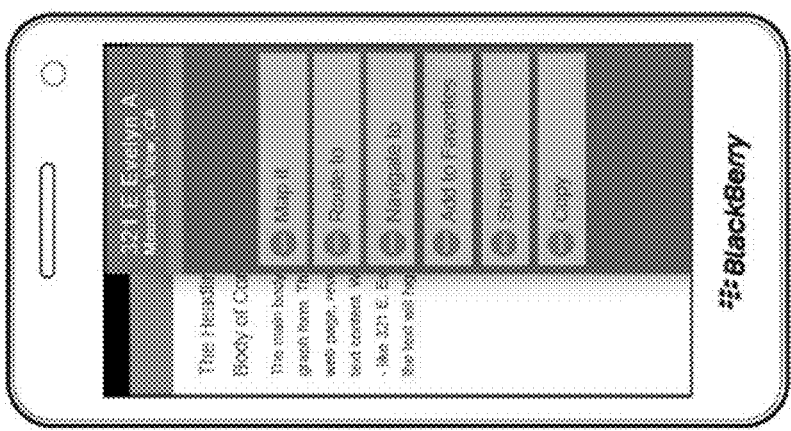
FIGS. 11*a*-11*c* depict mobile device user interfaces for displaying a menu of action options for performing various actions in relation to a place.
Figure 11B:
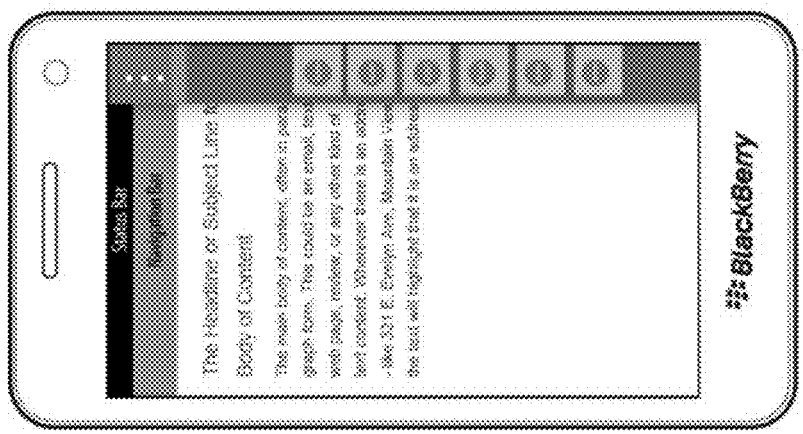
Figure 11A:
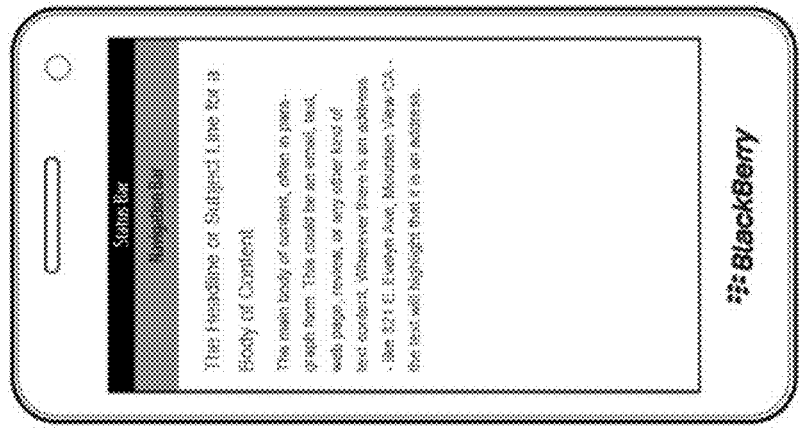

FIGS. 11a-11c depict mobile device user interfaces for displaying a menu of action options for performing various actions in relation to a recognized place in the text field. Specifically, FIG. 11a shows a UI displaying a corpus of textual content from which an address is identified. Identification of the address may be done by parsing the text. The address may be hyperlinked or otherwise highlighted. A menu may slide out from the right side of the UI, as shown in FIG. 11b to provide menu items (actions) that may be performed in relation to the location (address). For example, the menu items may include actions such as map it, route to, navigate to, add to favourites, share, copy, etc. The add to favourites action adds the place to the Places repository, e.g. to the centralized place database.

Figure 12C:
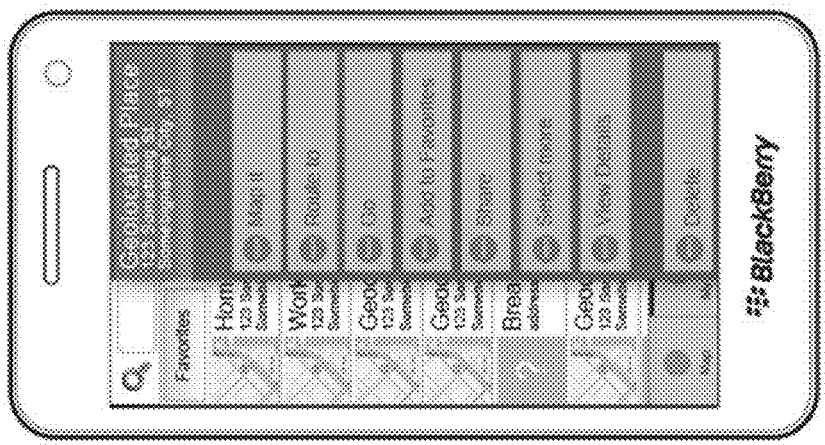
FIG. 12*c* depicts a menu of action options for performing various actions in relation to a geolocated place.
Figure 12B:
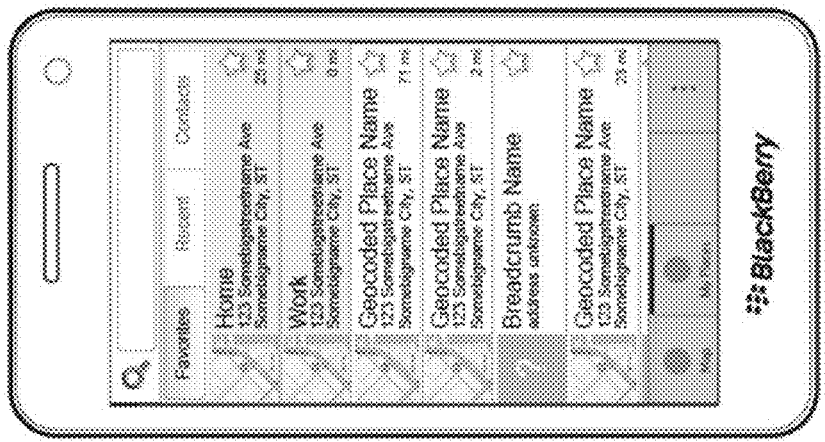
FIGS. 12*a*-12*b* depict mobile device user interfaces that enable toggling between a map and a list of favourite places ("My Places")
Figure 12A:
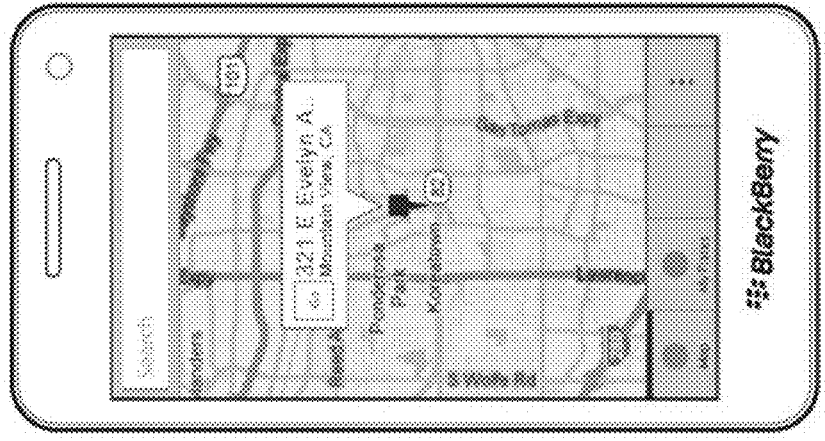

FIGS. 12a-12b depict mobile device user interfaces that enable toggling between a map and a list of favourite places ("My Places"). Specifically, in FIG. 12a, a map is displayed on a mobile device to show, in this example, a pushpin icon representing a specific address. The address is displayed in this example in a text bubble or callout that points to, or is otherwise associated with, the pushpin icon. The UI may comprise a map button and a My Places button (e.g. at the bottom of the screen, below the map, as shown by way of example in FIG. 12a). These buttons may be touched or selected to toggle between a map view and a places view such as the one shown by way of example in FIG. 12b. The user may then touch or select any one of these places. In response to touching a place, an action menu is then displayed as shown in FIG. 12c. This menu of action options enables the user to perform various actions in relation to a place such as map it, route to, go, add to favourites, share, select more, view details, delete, etc.

Figure 13D:
FIGS. 13*a*-13*d* depict various place-related user interfaces.
Figure 13C:
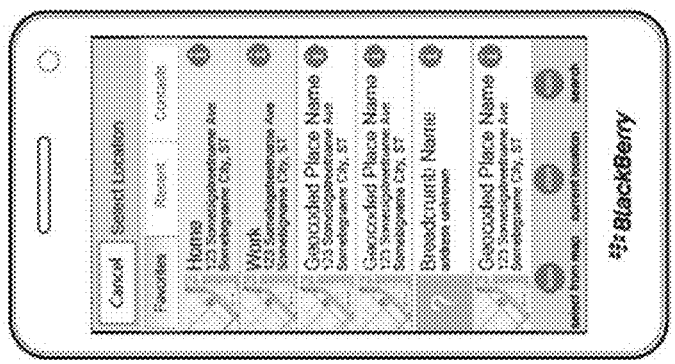
Figure 13B:
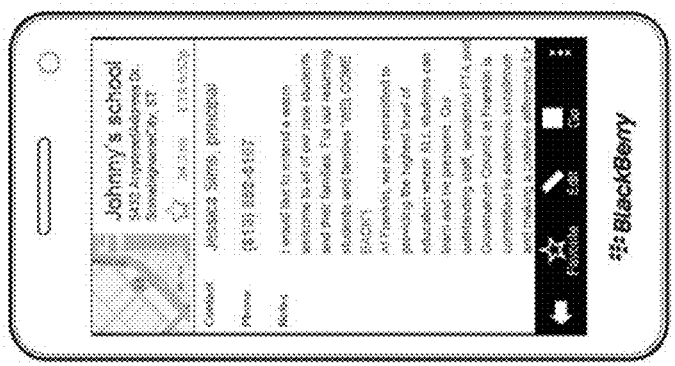
Figure 13A:
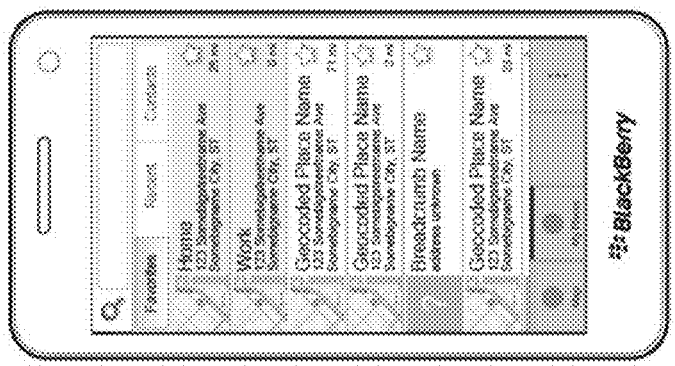

FIGS. 13a-13d depict various place-related user interfaces as further examples. These figures illustrate the concept of providing place details for a selected place. For example, from the UI of FIG. 13a, the user may select one of the listed places to obtain place details such as shown in FIG. 13b. Likewise, the user may select a place displayed on the UI of FIG. 13c to obtain place details as shown in FIG. 13d.

Another set of examples (FIGS. 14-17c) illustrate how place-related place data may be exploited to provide new device functionalities and features that were hitherto not possible with pre-existing technologies. In these figures, a place is defined in terms of a predetermined proximity to a place, in this example a user-specified address (e.g. "Near 474 March Rd"). The device may be configurable to specify a distance threshold, spatial tolerance or radius that defines "near", e.g. within 50 meters, 100 meters, 250 meters, 1 km, 10 km, etc. In other embodiments, the device may provide a tiered approach, defining "at" to be within 10 meters, "near" to be within 100 meters, and "in the same general vicinity" to be within 1 km, for example. These examples illustrate how a given application executing on the mobile device or even multiple applications acting in concert or executing in parallel, may retrieve or obtain from the central place data store whatever place-related data is available for the place selected by the user or otherwise identified as the desired place by the mobile device. In each instance, the device may use this place-related data to provide location-based services (LBS) or may display the place-related data to the user in any number of ways, some of which are presented below.

Figures 14A, 14B, 14C:
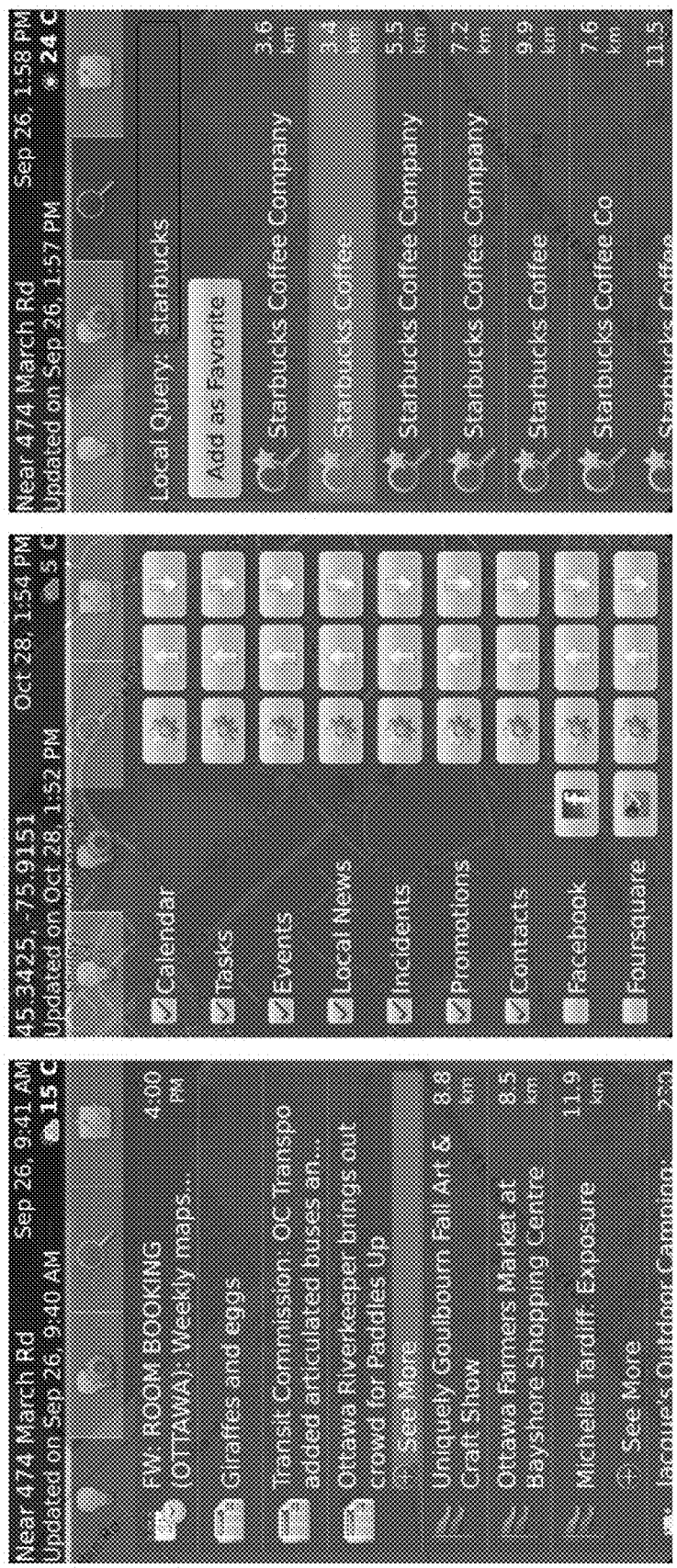
FIG. 14*a* depicts a place view UI that lists all content related to the place.
FIG. 14*b* depicts a UI that enables the user to control which types of content is to be presented.
FIG. 14*c* depicts a local query UI with a UI element for adding one of the search results as a favourite place.

FIG. 14a depicts a place view UI that lists all content related to the place, i.e. all content relevant to the user's current location at that particular time that is, or might be, of interest to the user. This UI is an example of how a place view may present place-related information to the user of various types (i.e. for various applications). For example, as shown in FIG. 14a, the place view presents a calendar entry, local news, and local events/POIs. This UI thus provides a consolidated (overview) display of all place-related content where the displayed items of content are associated with a plurality of different applications. FIG. 14b depicts a UI that enables the user to control which types of content is to be presented on this consolidated (overview) display. Other functionalities may be provided on these UIs. For example, near the top of each screen are user interface elements that provide functionalities such as view list, configure which applications to show, search and view map. For example, touching the search button will cause the UI to switch to a search screen such as the one depicted in FIG. 14c. As shown in FIG. 14c, the local query may be entered. Search results are displayed along with distance information. A UI element is provided for adding one of the search results as a favourite place.

Figure 15B:
FIG. 15*b* depicts a map showing a POI augmented with location-based advertising.
Figure 15A:
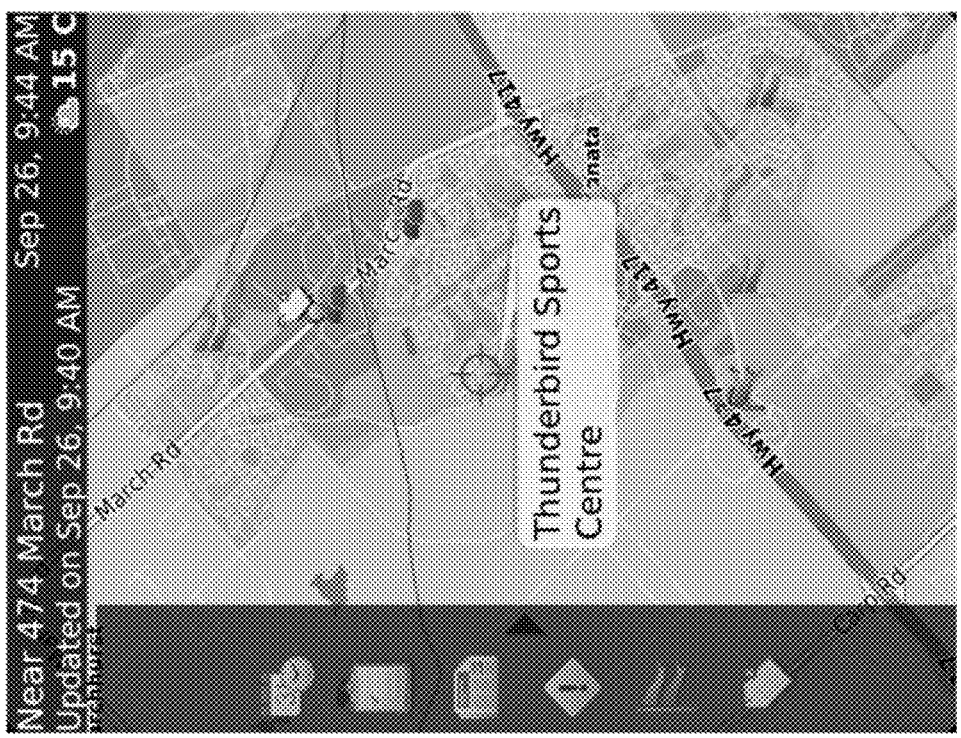
FIG. 15*a* depicts a map showing a POI that is near a place.

FIGS. 15a and 15b show how points of interest (POIs) may be displayed near the place selected by the user or otherwise identified by the mobile device or other computing device. The POI may be filtered by user preferences, which may have been set explicitly by the user or which may have been learned by monitoring usage patterns of the mobile device at this or other places. FIG. 15a depicts a map showing a POI that is "near 474 March Rd". In FIG. 15a, the POI ("Thunderbird Sports Centre") may be of interest to the user because of some prior relationship with that POI (visited there, placed a phone call there, e-mailed there, visited their website, searched for sports centres, etc.)

FIG. 15b depicts a map showing a POI augmented with location-based advertising "First Bank: Check out the savings!". This figure shows a map corresponding to the content shown in FIG. 14A, with the ad or promotion in focus. The location-based advertising (LBA) may be filtered based on user settings and/or based on usage patterns. For example, the mobile device may recognize that the user has recently searched for banks, or has visited this bank in recent months, done online banking with that bank, or has a friend or contact that works there, etc.

Figures 16A, 16B, 16C:
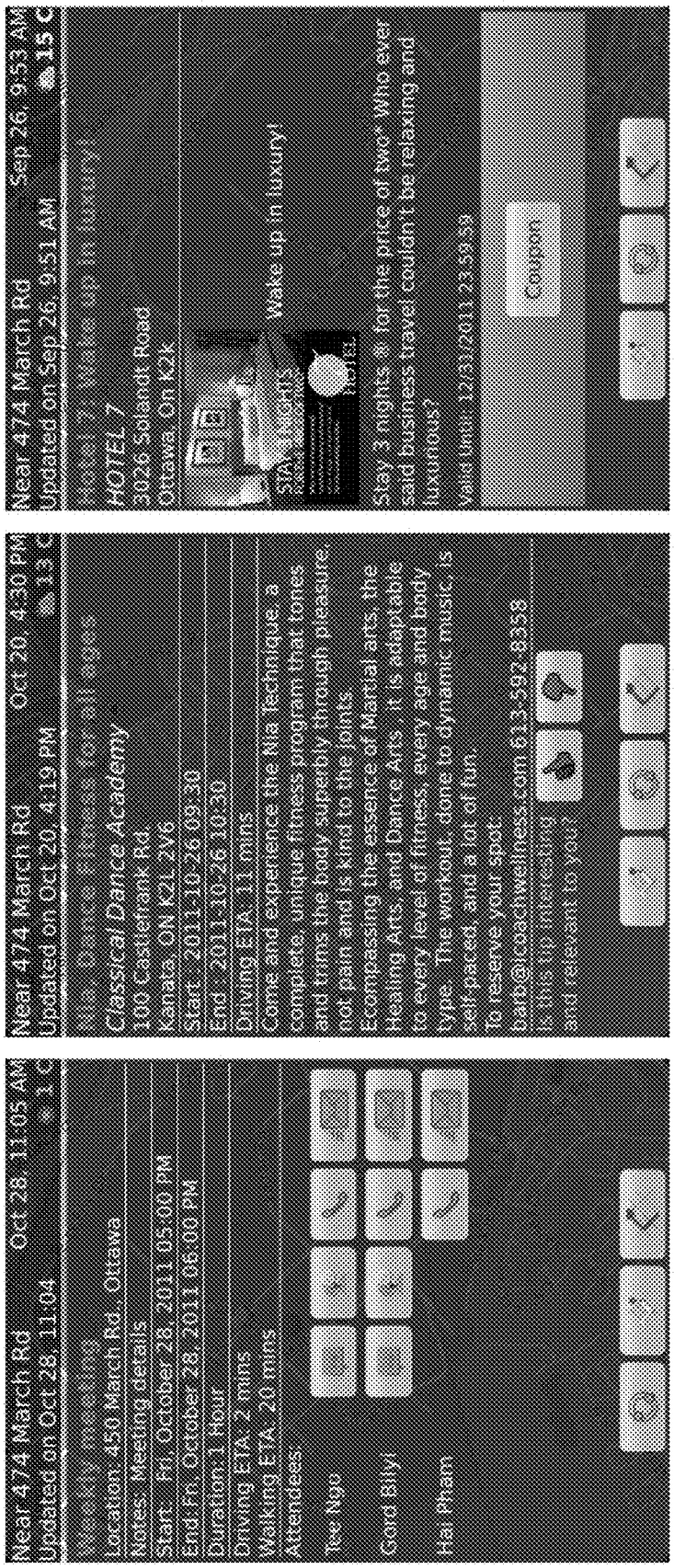
FIG. 16*a* depicts a place view for a weekly meeting.
FIG. 16*b* depicts one example of a place view for a commercial establishment.
FIG. 16*c* depicts another example of a place view for a commercial establishment.

FIGS. 16a-16c depict further UI examples of how place-related content may be delivered and presented to the user of the mobile device or other computing device.

FIG. 16a depicts a place view for a weekly meeting as one example of a calendar event. This calendar event may be stored in the calendar application data store but the location data and any other place-related information about the place where the meeting occurs every week is stored in the centralized place data store. This UI may be accessed by opening or viewing the weekly meeting entry in the calendar application which then queries the centralized place data store to obtain the place data for this place and any place-related information that may be relevant to the user for that place. Alternatively, the user may access this calendar entry via the places view by navigating to the place in question (e.g. using My Places) and then clicking on the calendar event that is listed for that place. In FIG. 16a, the UI presents an indication of the address of the place (e.g. "near 474 March Rd"), the current date and time, current weather conditions, and an indication of when the place data was most recently updated. The UI also specifies the event location, start and end times, the driving and walking times (ETA) from the current location to the meeting or event location. Also noteworthy are the list of attendees who are scheduled to attend the meeting, as well as a plurality of user-selectable icons or interface elements that enable the user to communicate or otherwise interact with any one of the attendees. The attendees are examples of relationships (mentioned above) for the place. Other examples of relationships may be a pool of tennis players with whom a user habitually plays at a tennis club. When the user accesses the place view for the tennis club, these contacts may be displayed.

FIG. 16b depicts another example of a tip or suggested event that is suggested by the device to the user based on contextual information gleaned by the device about the user's habit and behaviour at that place. In this case, the device learns that the user enjoys attending dance classes at a nearby dance academy. The device then suggests to the user that she consider attending an upcoming dance class at the dance academy. This suggestion or tip enhances the user experience by informing the user of events, activities, offers, promotions, opportunities, etc. that are local or proximate to one of the user's places.

In addition to the address, start and end times, and driving time, the tip UI may present a description of the event or appointment, contact information (e-mail and phone) for reserving a spot at the dance class. The UI may present tip feedback icons (thumbs-up and thumbs-down icon, or yes/no, or a rating scale). Soliciting and obtaining this direct feedback from the user is another way of learning usage patterns, interests and preferences of the user. Future tips can be refined based on whether the user found the tip, suggestion or offer interesting. These tips may be generated by the mobile device or they may originate as LBA, which the device can filter or even modify (e.g. reformatting content) for the device.

FIG. 16c depicts an example of LBA that is offered to the user of the mobile device. In this example, the UI displays the ad or promotional offer onscreen. The offer, in this particular example, contains an e-coupon. A user interface element ("Coupon") may be displayed onscreen to permit the user to download the e-coupon.

FIGS. 17a-17c depict various further example place views where the place is again defined in terms of a predetermined proximity to the same specified address (e.g. "Near 474 March Rd"). Once the place and its distance threshold has been set, as described above, the application (contacts) may request any contacts that are at this place (i.e. at or near 474 March Rd). By applying this filter, the contact Gord Bilyi is provided from the centralized place data store to the contacts application which can then display the contact for the user. Various user interface elements may be provided to interact with the contact, e.g. send mail, call, navigate to the contact's location, etc. As further depicted by way of example, the UI may also display an update time indicating when the data was last updated (e.g. "Updated on September 26, 1:57 PM").

In FIG. 17b, the place has been used to obtain information about a local coffee shop ("Tim Hortons") that is near 474 March Rd, e.g. via a local search or local query filtered using the location of the place. The address, phone number, rating, driving time, walking time are displayed in this example, along with the update time indicating when the data was last updated.

As another example, FIG. 17c depicts a place view that presents an intersection near 474 March Rd for the purposes of providing a traffic update. When launching a traffic application using the place "near 474 March Rd", the device identifies an intersection where there is a traffic alert, construction or road condition update.

In addition to the contacts, local search and traffic examples presented in FIG. 17a-17c, many other applications may require place data such as, but not limited to, a calendar, e-mail, instant messaging (e.g. BBM), MMS, navigation, travel, maps, and various social network applications, etc.

Figure 18:
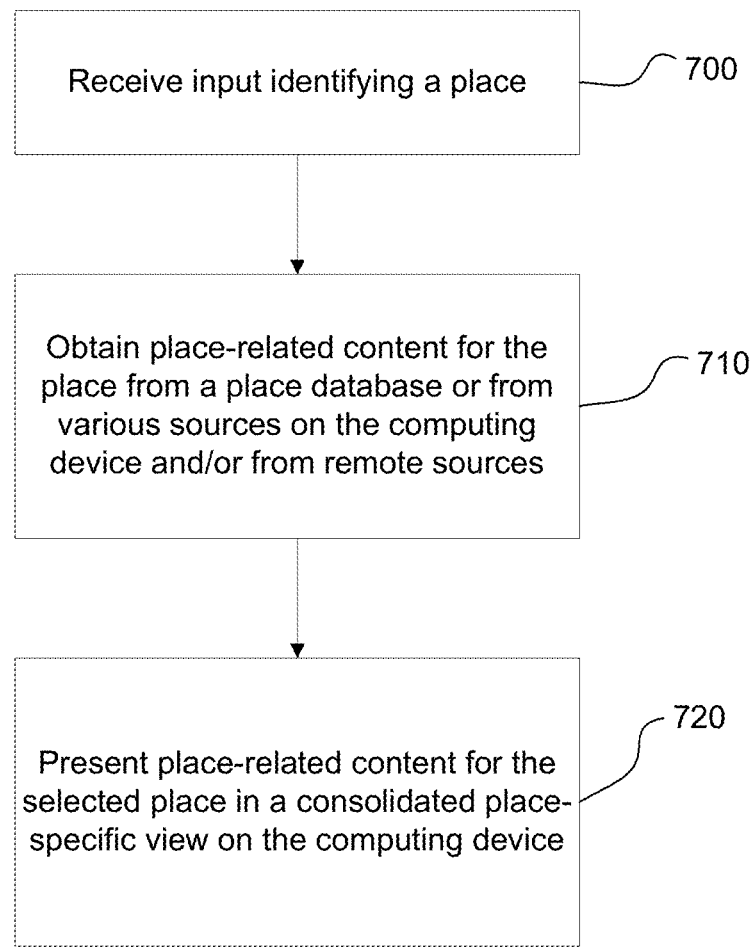
FIG. 18 is a flowchart depicting a method of presenting place-related content on a mobile device.

FIG. 18 is a flowchart depicting a method of presenting place-related content in a consolidated place-centric view. The place-centric or place-specific view ("place view" for short) presents a consolidated view of all or a subset of the available place-related content for a place. Determining which content is displayed may be done by the device based on settings, preferences or user input indicating which types of content are preferred by the user or most relevant to the user.

As depicted in FIG. 18, a computer-implemented method of presenting place-related content on a computing device entails a step 700 of receiving input identifying a place. This input may be user input received via a user interface. For example, in one embodiment, the input may be user input selecting a favourite place from a list of user-specified favourite places, a recent place from a list of recent places, or from any other list of places. In another embodiment, the input may be received automatically or programmatically (i.e. without user input or user intervention) from a component or subsystem of the computing device, e.g. from a position-determining subsystem such as a GPS chipset which may provide current position data representing a current position of the computing device.

Still referring to FIG. 18, in response to receiving input identifying a place, the method then involves, at step 710, obtaining place-related content for the place from a place database or, alternatively, from various sources stored locally on the device and/or remotely accessible by the device. The place database, in one embodiment, is a single centralized place database that stores all place-related data related to each one of a plurality of places. In another embodiment, where the data is not centralized in a single place database, the device may include a centralized place data management service (Places Service) which retrieves related content from various sources. The method then involves a step 720 of presenting the place-related content from the place database in a consolidated place-specific view. The consolidated place view presents all types of related content at or near (i.e. within a predetermined proximity of) the selected place: matter-of-fact content, recommended content, discoverable content and predictive content.

The consolidated place view presents all related content at or near the selected place that (a) is relevant to the user here and now; and/or (b) is relevant to the user at some point in the (near) future (predictive content); and/or (c) might interest the user based on user preferences (recommended content); and/or (d) might interest the user based on the user's social graph (discoverable content); and/or (e) is displayable based on privacy/permission/security settings.

The content presented in the place view may be obtained from various place data sources, which may be on the device and/or off the device. In one specific implementation, the place data is obtained by a place data management service which receives the place data request and then aggregates all of the content for the place by retrieving it from the various source which may be on or off the device. In another implementation, the content can be retrieved from a centralized place database or repository.

The place view enables the user to perform actions that are relevant to the type of place data being presented. For instance, call the place, browse the place's web site, share the place with a friend, e-mail a contact that has been at that place, view a video of an event that took place at that place, obtain directions to the place or related/nearby place.

The place view serves as a pivot point to a people view (contacts) or event view (calendar). In other words, the processor of the computing device is configured to cause the place view to switch to a people view in response to selecting a contact from the place view. The processor is also configured to cause the place view to switch to an event view in response to selecting an event from the place view.

Figure 19:
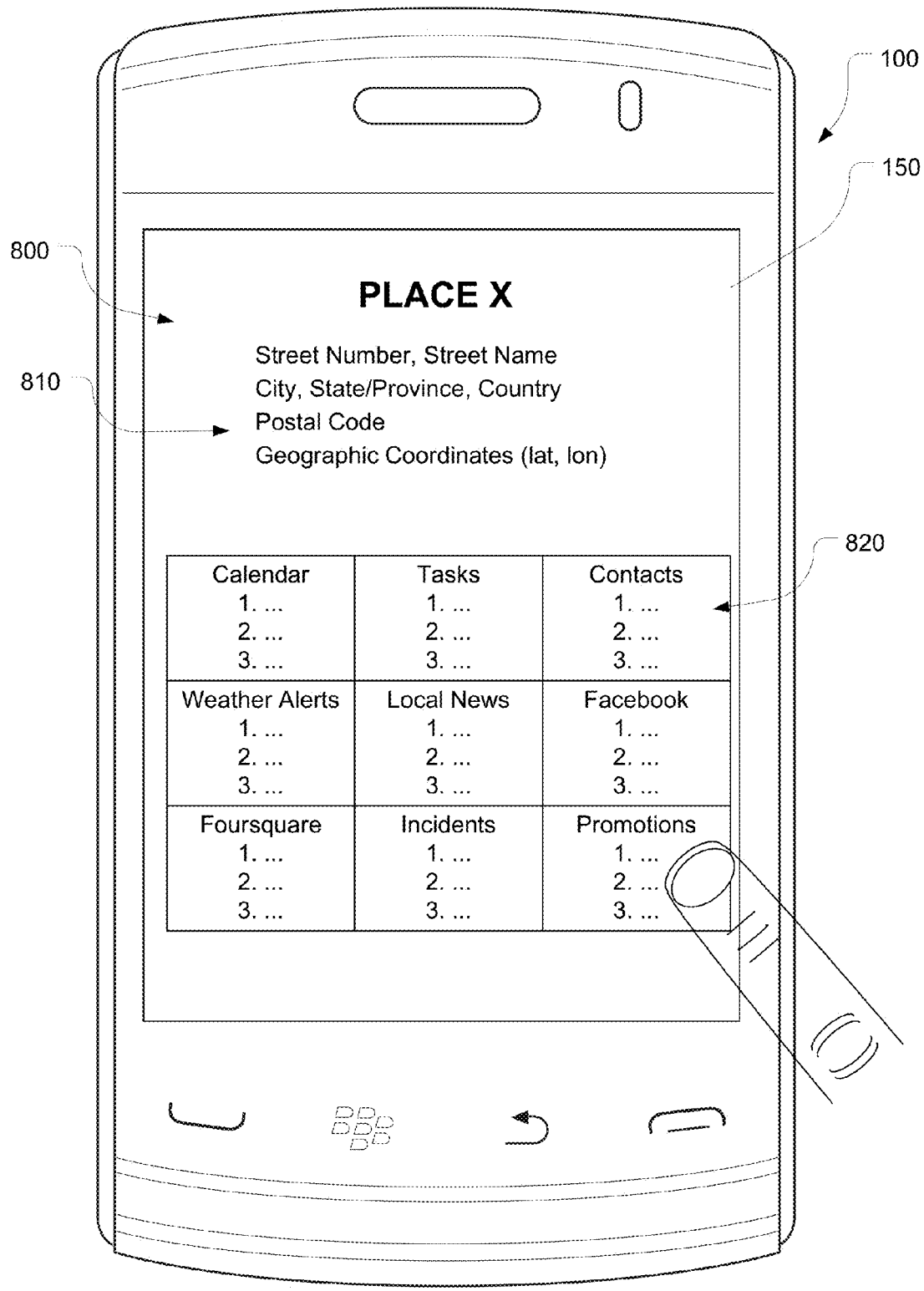
FIG. 19 depicts an example UI presenting a place view displaying a consolidation of various types of place-related content for a place.

FIG. 19 depicts an example UI denoted by reference numeral 800 presenting a place view displaying a consolidation of various types of place-related content for a place. FIG. 19 shows the UI displayed on a display 150 of a mobile device 100 although this UI may be displayed on any other computing device. The UI 800 depicted by way of example in FIG. 19 is similar to the example UI of FIG. 14a in that it presents a consolidation or collection of place-related content for a plurality of different types of data, i.e. for data that is created from different applications on the computing device. In the example UI of FIG. 14a, the place view is in a simple list format, with the place-related content being organized, ordered or bundled in groups of sequentially listed items that are related to the same application or to the same type or category of data, e.g. all local appointments, then all local news, then all local events, etc. In the example UI of FIG. 19, the place view may include place information 810 (place name, identifier, address, coordinates, etc.) as well as a plurality of onscreen panels 820 (or zones, areas, sectors, boxes, drawers, or windows) for each one of a plurality of different data sources or categories. For example, in the case of a touch screen device, each panel may be a user-selectable interface element which, when touched, provides access to a complete listing of all content in that category. In other words, as depicted in FIG. 19, the place-related content may be organized thematically according to categories of data, e.g. tasks, contacts, events, news, weather alerts, etc. that relate to the place. The method may thus involve displaying a plurality of categories of data within the consolidated place-specific view. Within each category of data, all or a subset of the available place-related content from the place database may be displayed. The presentation, arrangement and appearance of the panels may be manually configurable by the user or may be automatically adjusted based on usage patterns. Panels that are more frequently consulted by the user may be displayed more prominently. Panels that are seldom consulted may be displayed less prominently or even eventually omitted.

As depicted in FIG. 19, the categories of place-related content may include calendar events, tasks, contacts, weather alerts, local news, incidents, promotions, social media feeds (e.g. Facebook, Foursquare, Twitter, etc.). Each of these categories may have its own panel 820. In a variant, group panels may be provided for groups of applications or data sources (e.g. social media, weather and news, etc.) In each instance, the content is filtered to include only place-related content that relates to the place, e.g. tasks that relate to the place, news that relate to the place, weather alerts that relate to the place, etc.

In one implementation, all of the place-related content for the place is obtained from a centralized place database on or accessible by the computing device. The centralized place database may be a single integrated database containing all place-related data. This database may be stored as a single centralized database in a memory of the computing device or on a remote server accessible by the computing device. Alternatively, the database may be a distributed database involving multiple remote data stores, server clusters or a cloud computing environment. In some implementations, the place data is obtained from a plurality of sources stored on the device and/or stored externally to the device. In these implementations, a place data management service processes requests for place data for a place and then collects all of the place data from the various sources by sending requests to, and receiving replies from, each of these sources.

Figure 20:
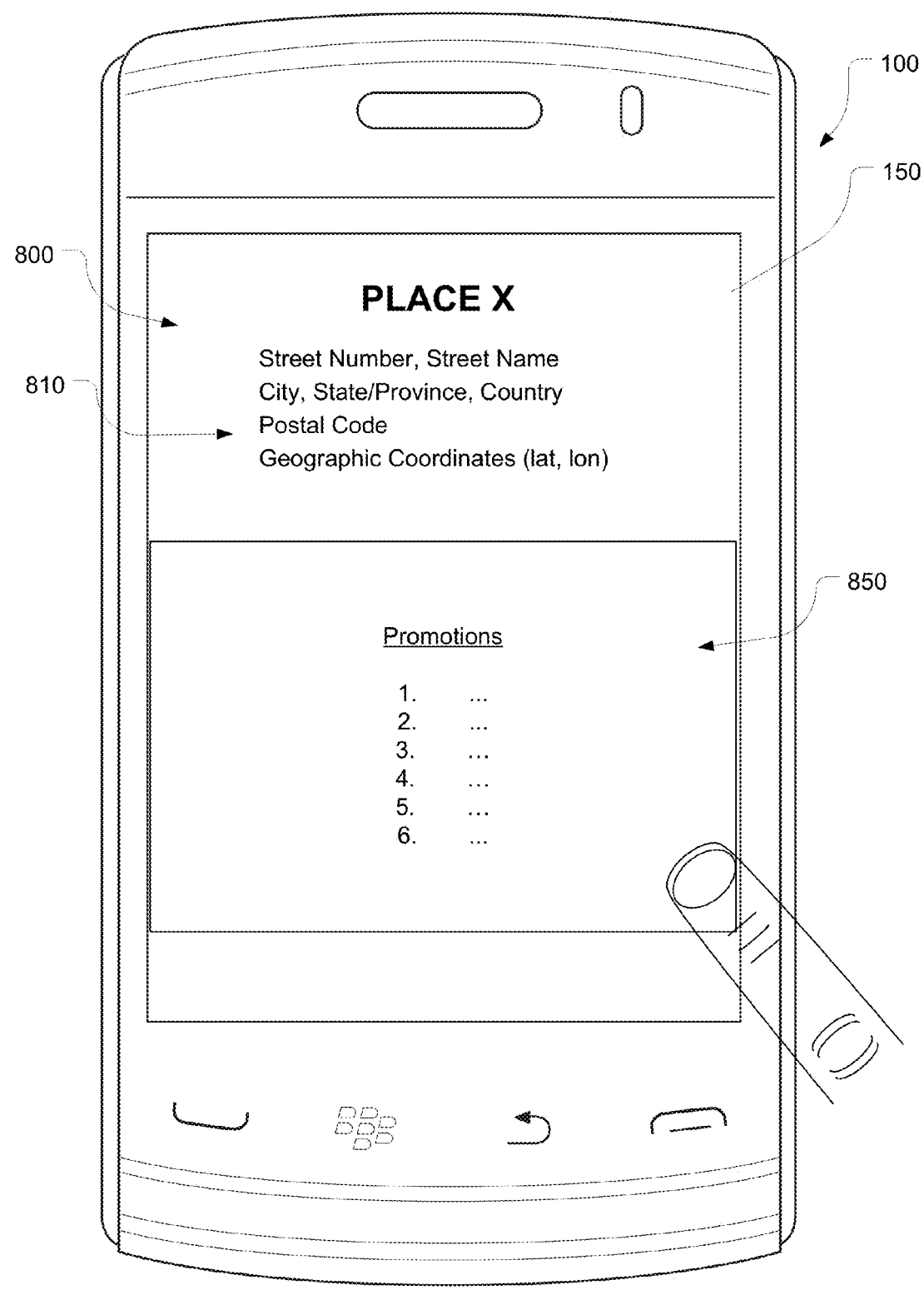
FIG. 20 depicts an example UI depicting an expanded view of one category of place-related content (e.g. a list of promotions that relate to the place).

FIG. 20 depicts an example UI 800 depicting an expanded view of one category of place-related content (e.g. a list of promotions that relate to the place). In response to user input selecting the category promotions, the UI of FIG. 20 is displayed to replace that of FIG. 19. The UI of FIG. 20 presents a category-specific panel 850 with the full listing of all of the promotions available at or near the selected place. Note that FIG. 19, due to space constraints of each panel, may not be able to present all of the promotions related to the place in the onscreen space allotted for that panel. Accessing the full listing in the expanded panel 850 presented in the UI of FIG. 20 enables the user to view the complete list of all promotions available at the place. As will be appreciated, in some instances, all of the content for a given category may be viewable on the UI of FIG. 19. When only a subset of the content is presented in the UI of FIG. 19, there may be an indicator, e.g. graphical indicator(s), word(s), symbol(s), icon(s), etc. to indicate that more content is available and can be accessed by clicking or touching the user-selectable interface element (e.g. panel 820) associated with the particular application or category of data. As was shown in FIG. 14*a*, the place view may optionally display in association with each entry or item start and/or end times as well as distances or directions to events, meetings, appointments, etc. As was also shown in FIG. 14*a*, the place view may include an address, a current date and time, and current weather. As further shown in FIG. 14*a*, the place view may also display the update time (when the place data was most recently updated).

The place view is thus a consolidation or collection of place-related content, obtained from a centralized place data management service that obtains place data from one or more data sources or databases, such as, for example, a single centralized place database on the device or, alternatively, a plurality of data sources on or off the device. The place view provides the user with a complete overview of all content and information that are relevant to a specific place. Presenting all place-related information for a place enables the user to draw useful inferences and to make intelligent choices about what to do, who to see, and what is happening at a given place.

In one implementation, the computing device may comprise an artificial intelligence (AI) module for drawing inferences and then making suggestions or offering tips to the user, based on the various place data for a given place. One example of a device offering tips to the user was disclosed above in relation to FIG. 16*b*. A place view may thus, in one embodiment, display one or more tips or suggestions related to the place. Where there are multiple tips for a place, these tips may be displayed either concurrently or sequentially. The place view may also display a tip feedback query to solicit feedback from the user as to the usefulness of the tips, thereby enabling the AI of the device to learn or refine its understanding of the user's preferences and interests.

In a further implementation, the inferences drawn by the AI of the device may be made by cross-referencing or correlating different types of place-related content created from different applications or drawn from different sources. In other words, the AI may generate a tip based on the common occurrence of one type of place-related content with another type of place-related content.

For example, the device may draw an inference that the user probably will perform action A if event B is occurring nearby ("condition B") and if contact C is also present nearby ("condition C"). If conditions B and C are concurrently satisfied, the device may then offer a tip or suggestion to the user to perform action A. This action may be suggested to the user by the device by displaying a suggestion or tip that the user can accept or reject, thus providing feedback that refines the AI model representing the device's understanding of the user's preferences and interests with respect to the place. The device may store an AI behaviour model for each place that characterizes what the user is likely to do at the place if various sets of conditions are met. The device may be configurable to activate or deactivate the AI behaviour model and/or the tips function.

In addition or in lieu of the AI behaviour model, the device may enable the user to create, edit, or delete various rules, filters, logic, conditions, etc. These may be defined by the user to enable the device to draw appropriate inferences. For example, the user may specify that if event X is occurring near the place and weather condition Y is occurring, then to display a tip, or provide an alert, or perform an action.

As another example, place-related tasks may be automatically created, modified or deleted as a function of these conditions or rules. For example, a task T (soccer game) may be automatically created if contacts X, Y and Z (his teammates) are all present, event B is occurring (the game is still scheduled), there are no traffic incidents and the weather is good. These examples are provided solely to illustrate how the place view concept can be developed to provide tips and suggestions based on logical inferences (or fuzzy logic) made by the device by correlating or cross-referencing various types of content related to the place.

Other features and options may be provided in relation to the place view.

For example, in one implementation, the place view may also present a place-dependent notification profile to control the manner in which incoming messages (e-mail, SMS), incoming phone calls, event reminders, etc. are handled by the device. If the user is at a particular place, a place-specific notification profile may be automatically engaged for that place. For example, if the user is at work, a work-specific notification profile (e.g. vibration only) may be automatically engaged. If the user is at home, a different home-specific notification profile is automatically engaged. The notification profile may optionally be displayed as part of the place view. The notification profiles for each place may be further refined by taking into account the time and date. The place view may optionally display a user-selectable interface element to define a place-specific notification profile.

The place view may also provide, in one embodiment, a user-selectable interface element for defining the geographical scope of the place. This enables the user to specify a radius, distance, geofence, geographical entity, etc. that defines the spatial limits or boundaries of the place. Thus, the user may specify that the place is 123 Main Street with a radius of 1 km. Defining the place may entail selecting a current location (which thus saves the GPS coordinates as the center of the place) and then specifying a radius. Alternatively, defining the place may entail entering or selecting a street address, entering or selecting a postal code or zip code, city, town, neighbourhood, borough, or any other predetermined geographical entity. Graphically drawing boundaries on a map, e.g. with a polygon drawing tool or lasso tool, is another way to define the geographical extent of a place. A default radius may be specified in a settings or options page.

Although a place is characterized by a single location and the contiguous geographical area surrounding the location, the device may be configured, in another embodiment, to handle composite places which may be defined as a composite of two or more places, e.g. two or more addresses, e.g. all addresses of a company, or a home address and a cottage address, etc.

In another implementation, the place view may provide a confidentiality, privacy or sensitivity filter that restricts the display in the place view of confidential, private or sensitive content. For example, a user may not wish to have the device display all content for the place. In such a case, certain place-related content may be marked as confidential, private or sensitive. A confidential, sensitive or private place view may be displayed that would display all content, even the confidential, sensitive or private content. The device may permit the user to switch between a confidential view (showing all content) and a public view (where certain content is suppressed or hidden). For example, the place view may optionally include a user-selectable interface element that enables the user to toggle between a confidential view and a public view. The place view may optionally display an icon, symbol or other indicium indicating whether the confidential view is active or not.

Any of the methods disclosed herein may be implemented in hardware, software, firmware or any combination thereof. Where implemented as software, the method steps, acts or operations may be programmed or coded as computer-readable instructions and recorded electronically, magnetically or optically on a fixed or non-transitory computer-readable medium, computer-readable memory, machine-readable memory or computer program product. In other words, the computer-readable memory or computer-readable medium comprises instructions in code which when loaded into a memory and executed on a processor of a computing device cause the computing device to perform one or more of the foregoing method(s).

A computer-readable medium can be any means that contain, store, communicate, propagate or transport the program for use by or in connection with the instruction execution system, apparatus or device. The computer-readable medium may be electronic, magnetic, optical, electromagnetic, infrared or any semiconductor system or device. For example, computer executable code to perform the methods disclosed herein may be tangibly recorded on a computer-readable medium including, but not limited to, a floppy-disk, a CD-ROM, a DVD, RAM, ROM, EPROM, Flash Memory or any suitable memory card, etc. The method may also be implemented in hardware. A hardware implementation might employ discrete logic circuits having logic gates for implementing logic functions on data signals, an application-specific integrated circuit (ASIC) having appropriate combinational logic gates, a programmable gate array (PGA), a field programmable gate array (FPGA), etc.

This invention has been described in terms of specific embodiments, implementations and configurations which are intended to be exemplary only. Persons of ordinary skill in the art will appreciate, having read this disclosure, that many obvious variations, modifications and refinements may be made without departing from the inventive concept(s) presented herein. The scope of the exclusive right sought by the Applicant(s) is therefore intended to be limited solely by the appended claims.

The invention claimed is:

1. A computer-implemented method of presenting place-related content on a computing device, the method comprising:
   in response to receiving input identifying a place, obtaining place-related content for the place by making a place data request to a place data management service on the computing device, the place data management service obtaining the place-related content for the place from a place data store that stores all place data contributed by applications on the device, wherein all place data requests from all applications on the computing device are handled by the place data management service; and
   presenting all or a subset of the place-related content in a consolidated place-specific view, wherein the place-specific view presents a contact associated with the place and an event associated with the place,
   wherein the place-specific view switches to an address book to display the contact in the address book in response to user input received with respect to the contact presented in the place-specific view, and
   wherein the place-specific view switches to a calendar application to display the event in the calendar application in response to user input received with respect to the event presented in the place-specific view.

2. The method as claimed in claim 1 wherein presenting the place-related content comprises presenting two or more of: content currently relevant to a user, predictive content predicted to be relevant to the user within a predetermined period of time, recommended content based on user profile and preferences, and discoverable content based on a user's social graph.

3. The method as claimed in claim 1 wherein presenting the place-related content comprises presenting the content based on privacy settings.

4. The method as claimed in claim 1 wherein presenting the place-related content comprises displaying one or more of: tasks that relate to the place, news that relate to the place, weather alerts that relate to the place, promotions that relate to the place, and social media feeds related to the place.

5. The method as claimed in claim 1 further comprising presenting in the place view a menu of actions that may be performed in relation to the place data being presented.

6. A non-transitory computer-readable medium comprising instructions in code which when loaded into a memory and executed by a processor of a computing device cause the computing device to:
   in response to receiving input identifying a place, obtain place-related content for the place by making a place data request to a place data management service on the computing device, the place data management service obtaining the place-related content for the place from a place data store that stores all place data contributed by applications on the device, wherein all place data requests from all applications on the computing device are handled by the place data management service; and
   present all or a subset of the place-related content in a consolidated place-specific view, wherein the place-specific view presents a contact associated with the place and an event associated with the place,
   wherein the place-specific view switches to an address book to display the contact in the address book in response to user input received with respect to the contact presented in the place-specific view, and
   wherein the place-specific view switches to a calendar application to display the event in the calendar application in response to user input received with respect to the event presented in the place-specific view.

7. The non-transitory computer-readable medium as claimed in claim 6 wherein the code for presenting the place-related content comprises code for presenting two or more of: content currently relevant to a user, predictive content predicted to be relevant to the user within a predetermined period of time, recommended content based on user profile and preferences, and discoverable content based on a user's social graph.

8. The non-transitory computer-readable medium as claimed in claim 6 wherein the code for presenting the place-related content comprises code for presenting the content based on privacy settings.

9. The non-transitory computer-readable medium as claimed in claim 6 comprising code for causing the device to display one or more of: tasks that relate to the place, news that relate to the place, weather alerts that relate to the place, promotions that relate to the place, and social media feeds that relate to the place.

10. The non-transitory computer-readable medium as claimed in claim 6 comprising presenting in the place view a menu of actions that may be performed in relation to the place data being presented.

11. A computing device comprising:
a memory operatively coupled to a processor for processing input identifying a place and, in response to receiving the input, for requesting place-related data for the place by communicating the request to a place data management service that obtains the place data from a place data store that stores all place data contributed by applications on the device, wherein all place data requests from all applications on the computing device are handled by the place data management service; and
wherein the processor, in response to receiving the place-related content for the place from the place data management service, causes a display to present all or a subset of the place-related content from the place database in a consolidated place-specific view, wherein the place-specific view presents a contact associated with the place and an event associated with the place,
wherein the place-specific view switches to an address book to display the contact in the address book in response to user input received with respect to the contact presented in the place-specific view, and
wherein the place-specific view switches to a calendar application to display the event in the calendar application in response to user input received with respect to the event presented in the place-specific view.

12. The computing device as claimed in claim 11 wherein the processor is configured to cause the display to present two or more of: content currently relevant to a user, predictive content predicted to be relevant to the user within a predetermined period of time, recommended content based on user profile and preferences, and discoverable content based on a user's social graph.

13. The computing device as claimed in claim 11 wherein the processor is configured to cause the display to present the content based on privacy settings.

14. The computing device as claimed in claim 11 wherein the place-specific view displays one or more of: tasks that relate to the place, news that relate to the place, weather alerts that relate to the place, promotions that relate to the place, and social media feeds that relate to the place.

15. The computing device as claimed in claim 11 wherein the display presents in the place-specific view a menu of actions that may be performed in relation to the place data being presented.

16. The method as claimed in claim 1 further comprising switching between a public view and a private view in response to user input, the private view displaying all content including confidential content, the public view not displaying the confidential content.

17. The non-transitory computer-readable medium as claimed in claim 6 further comprising code to cause the place-specific view to switch between a public view and a private view in response to user input, the private view displaying all content including confidential content, the public view not displaying the confidential content.

18. The computing device as claimed in claim 11 wherein the processor is configured to switch the place-specific view between a public view and a private view in response to user input, the private view displaying all content including confidential content, the public view not displaying the confidential content.

* * * * *